(12) United States Patent
Kunz et al.

(10) Patent No.: US 11,515,603 B2
(45) Date of Patent: Nov. 29, 2022

(54) SEPARATOR PLATE ARRANGEMENT FOR AN ELECTROCHEMICAL SYSTEM

(71) Applicant: Reinz-Dichtungs-GmbH, Neu-Ulm (DE)

(72) Inventors: Claudia Kunz, Ulm (DE); Sebastian Schaefer, Heroldstatt (DE)

(73) Assignee: Reinz-Dichtungs-GmbH, Neu-Ulm (DE)

( * ) Notice: Subject to any disclaimer, the term of this patent is extended or adjusted under 35 U.S.C. 154(b) by 191 days.

(21) Appl. No.: 17/156,228

(22) Filed: Jan. 22, 2021

(65) Prior Publication Data
US 2021/0234237 A1    Jul. 29, 2021

(30) Foreign Application Priority Data

Jan. 23, 2020 (DE) ............ 20 2020 100 346.1

(51) Int. Cl.
| | |
|---|---|
| *H01M 50/463* | (2021.01) |
| *H01M 50/406* | (2021.01) |
| *H01M 50/449* | (2021.01) |
| *H01M 50/431* | (2021.01) |
| *H01M 8/18* | (2006.01) |

(52) U.S. Cl.
CPC ....... *H01M 50/463* (2021.01); *H01M 50/406* (2021.01); *H01M 50/431* (2021.01); *H01M 50/449* (2021.01); *H01M 8/18* (2013.01)

(58) Field of Classification Search
None
See application file for complete search history.

(56) References Cited

U.S. PATENT DOCUMENTS

| | | | |
|---|---|---|---|
| 6,555,267 B1 * | 4/2003 | Broman | H01M 8/2483 |
| | | | 429/105 |
| 2016/0351921 A1 * | 12/2016 | Kunz | B21D 35/001 |

FOREIGN PATENT DOCUMENTS

| | | | | |
|---|---|---|---|---|
| DE | 102012002053 A1 | 8/2012 | | |
| DE | 102011052562 B4 * | 5/2014 | ......... | H01M 8/0273 |
| DE | 202015102771 U1 | 10/2016 | | |

OTHER PUBLICATIONS

Machine translation of Hickmann et al. DE-102011052562-B4 (Year: 2014).*

* cited by examiner

*Primary Examiner* — Wojciech Haske
(74) *Attorney, Agent, or Firm* — McCoy Russell LLP

(57) ABSTRACT

A separator plate arrangement for an electrochemical system, comprising a first metal sheet and a second metal sheet. The first metal sheet has a first circumferential sealing structure for sealing off an electrochemically active region, a first cutout arranged outside of the first circumferential sealing structure, and a first embossed structure arranged outside of the first circumferential sealing structure. The second metal sheet has a second circumferential sealing structure for sealing off an electrochemically active region, a second cutout arranged outside of the second circumferential sealing structure, and a second embossed structure arranged outside of the second circumferential sealing structure.

20 Claims, 10 Drawing Sheets

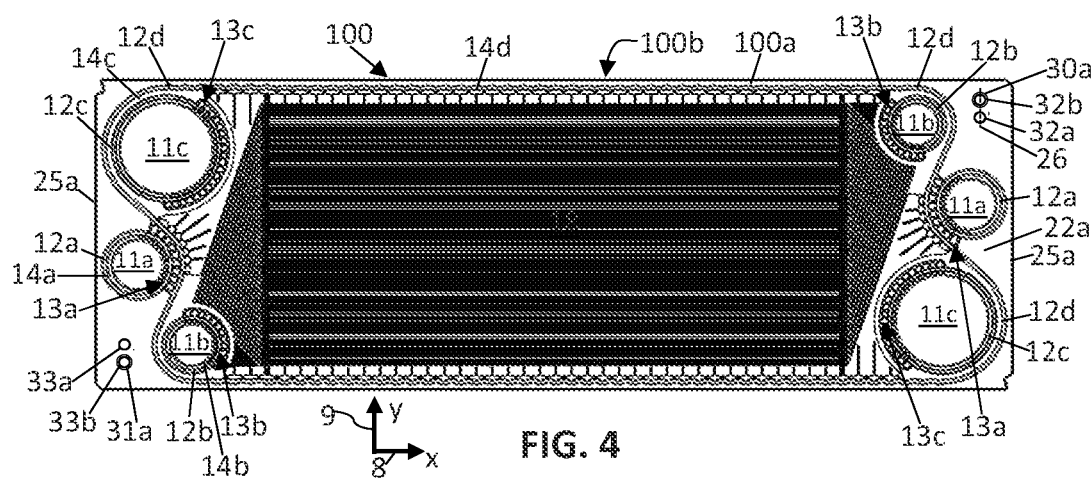
FIG. 4
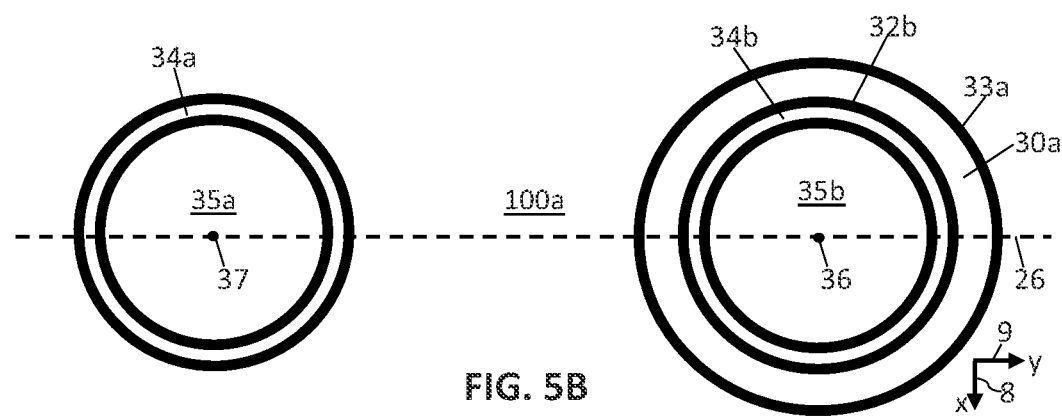
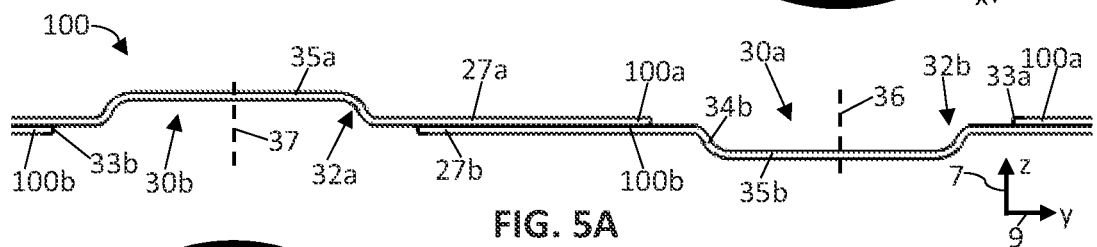
FIG. 5A
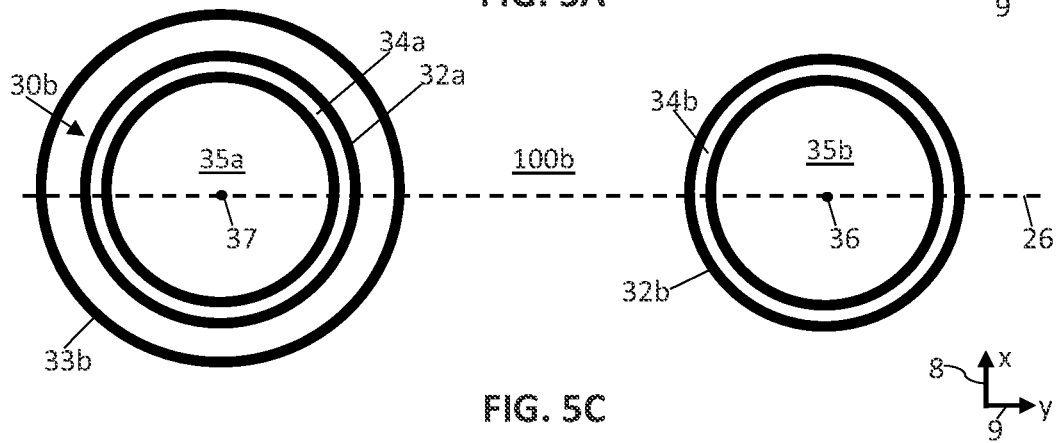
FIG. 5C

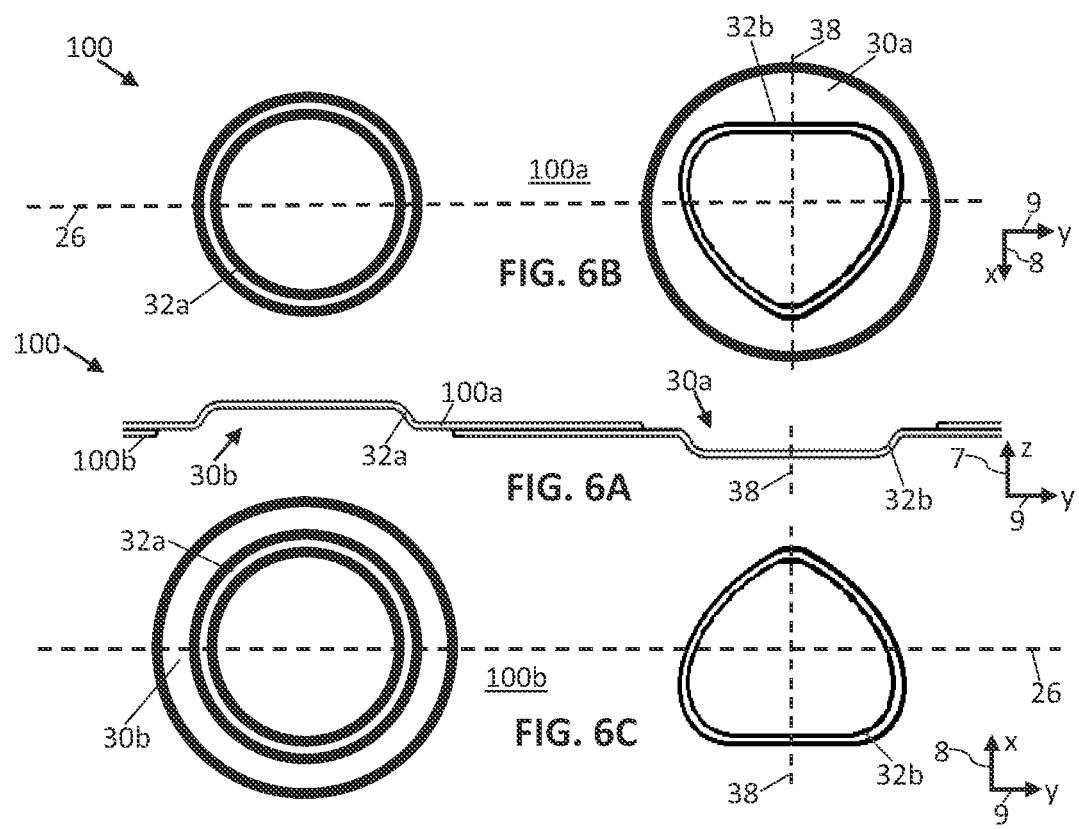
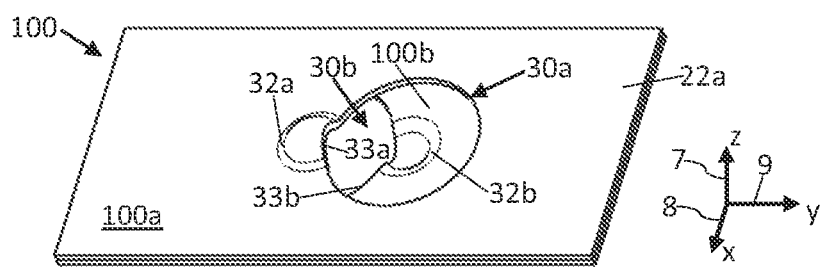
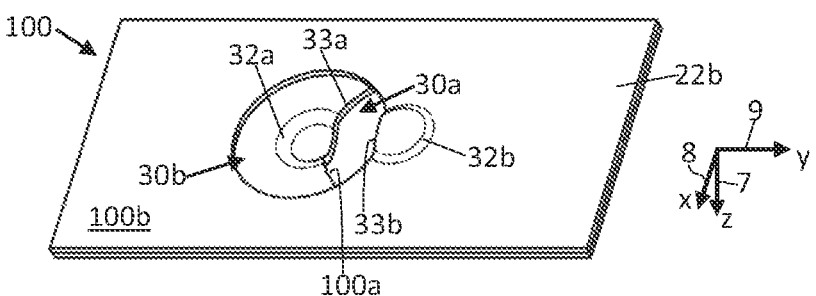
FIG. 7

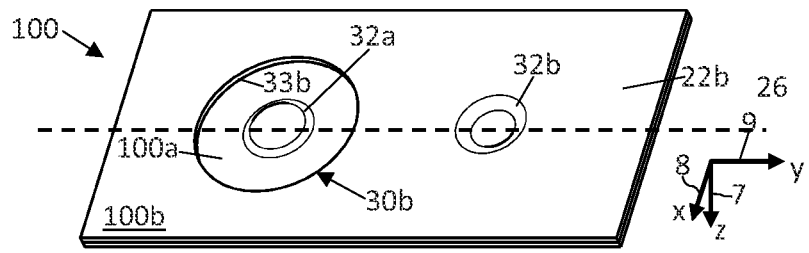
FIG. 8A
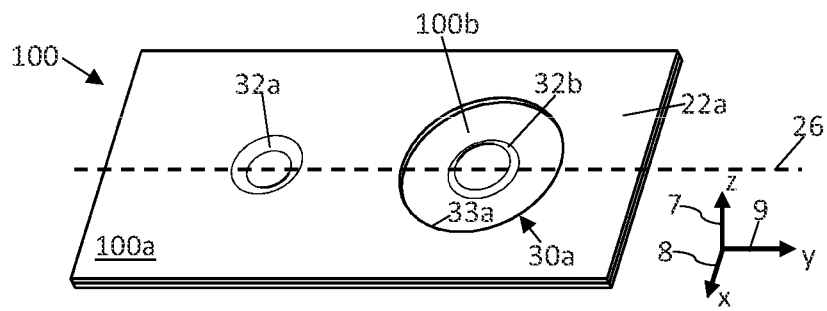
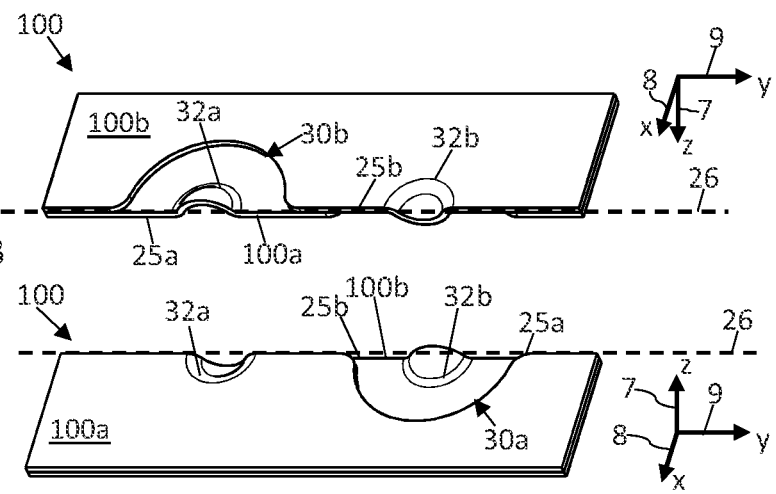
FIG. 8B
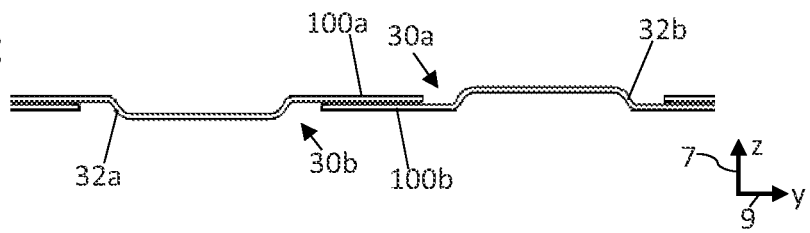
FIG. 8C

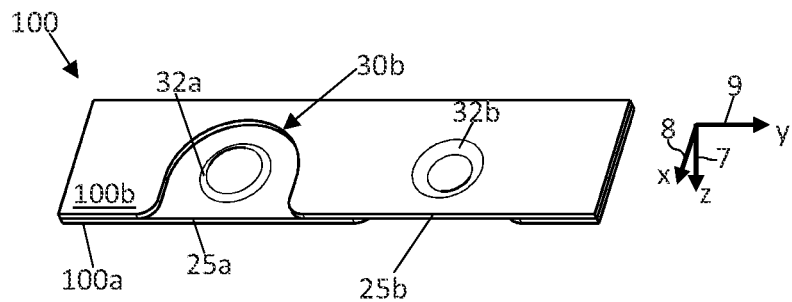
FIG. 9
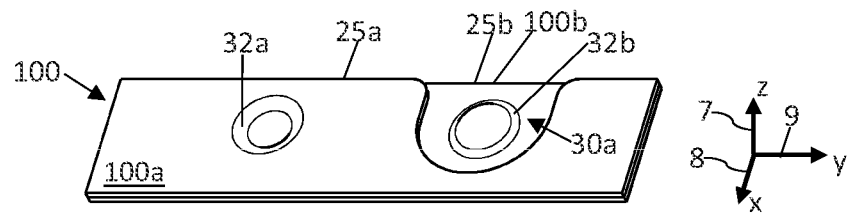
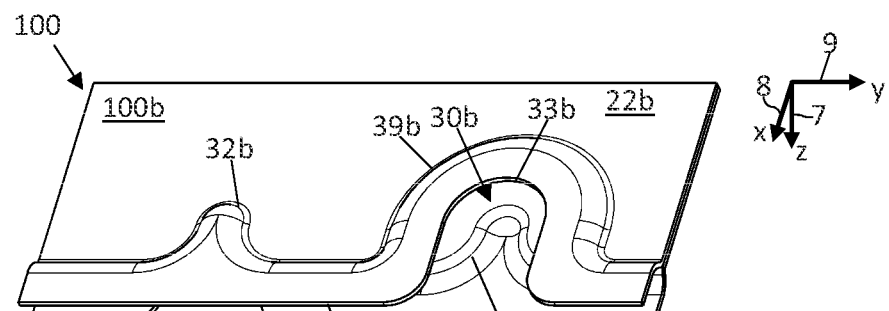
FIG. 10
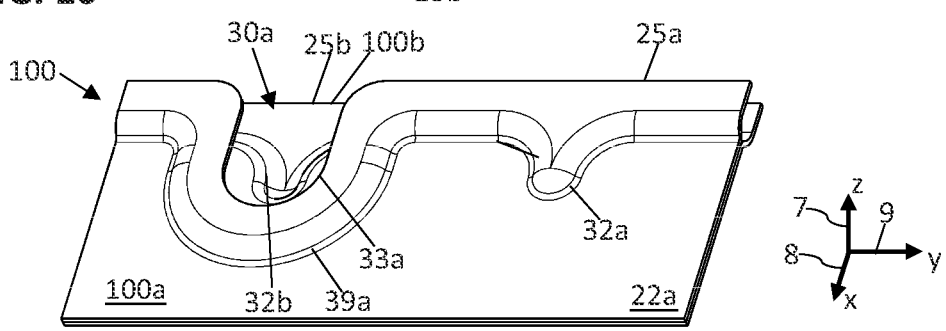

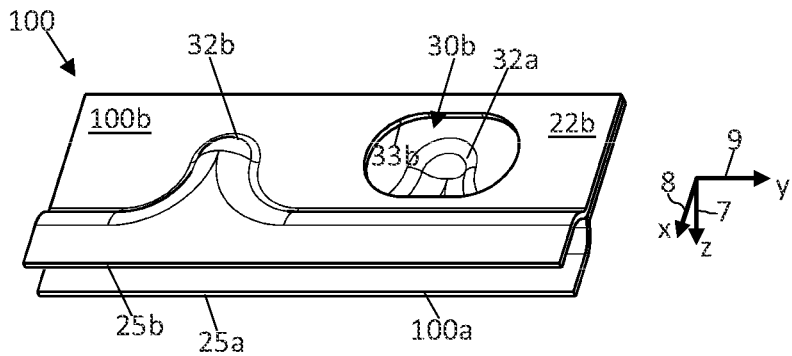
FIG. 11
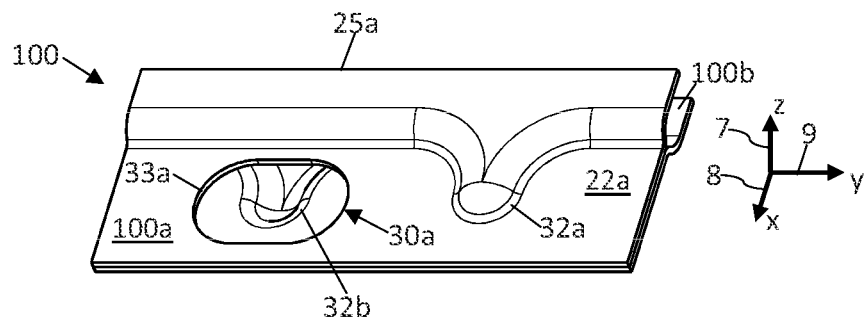
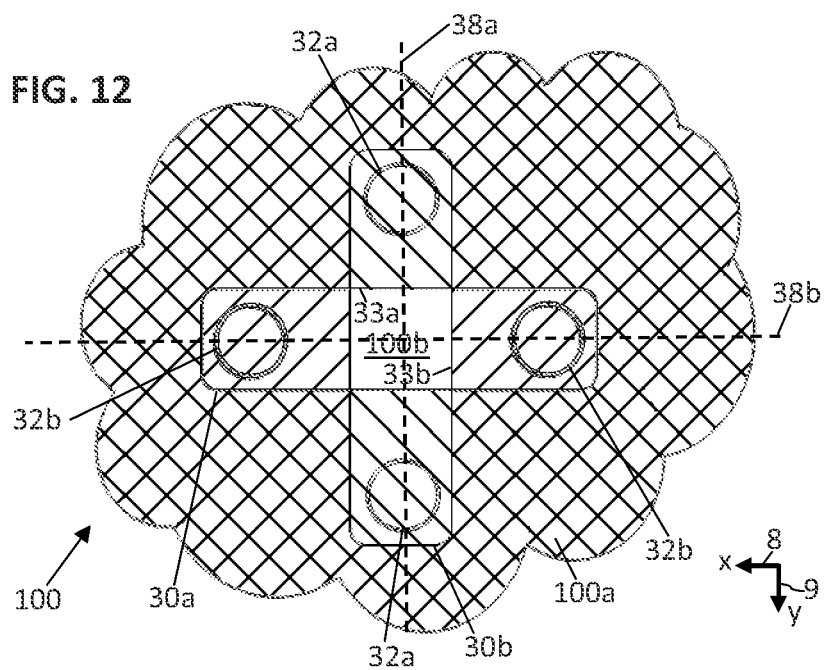
FIG. 12

SEPARATOR PLATE ARRANGEMENT FOR AN ELECTROCHEMICAL SYSTEM

CROSS-REFERENCE TO RELATED APPLICATION

The present application claims priority to German Utility Model Application No. 20 2020 100 346.1, entitled "SEPARATOR PLATE ARRANGEMENT FOR AN ELECTROCHEMICAL SYSTEM", and filed on Jan. 23, 2020. The entire contents of the above-listed application are hereby incorporated by reference for all purposes.

TECHNICAL FIELD

The present document primarily relates to a separator plate arrangement for an electrochemical system, comprising a first metal sheet and a second metal sheet. The present document also relates to a method for producing such a separator plate arrangement.

BACKGROUND AND SUMMARY

Known electrochemical systems, for example fuel cell systems or electrochemical compressor systems such as electrolyzers, usually comprise a stack of electrochemical cells which are each separated from one another by metal separator plates. These separator plates are often formed as bipolar plates. These separator plates or bipolar plates conventionally comprise two joined individual metal plates, which are typically welded together and are normally made of thin metal sheets. As a result, each separator plate or bipolar plate then comprises a first metal sheet and a second metal sheet. The separator plates, or the individual plates forming the separator plates, may be used, e.g., for the electrical contacting of the electrodes of the individual electrochemical cells (e.g., fuel cells) and/or for the electrical connection of adjacent cells (series connection of the cells).

The separator plates, or the individual plates or metal sheets forming the separator plates, may include a channel structure, which is configured to supply the cells with one or more media and/or to remove reaction products. The media may be fuels (e.g., hydrogen or methanol), reaction gases (e.g., air or oxygen) or coolants, for example. Such a channel structure is customarily arranged in an electrochemically active area (gas distribution structure/flow field). Moreover, the separator plates, or the individual plates or metal sheets forming the separator plates, may be configured to transfer the waste heat that arises during the conversion of electric or chemical energy in the electrochemical cell, and to seal the different media and/or channels with respect to one another and/or with respect to the outside. The aforementioned channel structures and/or sealing structures, in particular sealing beads, are customarily embossed into the individual plates using an embossing tool. Similar structures are also present in separator plates of humidifiers for electrochemical systems. What is stated below may therefore also apply accordingly to separator plates for humidifiers. When the term embossing is used in this document, it also encompasses deep-drawing and hydroforming in addition to embossing in the narrower sense.

It is known to provide each of the individual plates or each of the separator plates with one or more measuring structures. These are structures that are formed at or on the plates and detectable by way of an optical sensor and that, using a pattern or image recognition software, are used to establish a coordinate system aligned relative to the plate in a defined manner. This coordinate system is used, for example, for measuring the plate, for automatically positioning one or both of the plates in a tool or for measuring structures embossed into the plate(s) or structures applied onto the plate(s). The tool in which the plate(s) may be positioned in a defined manner by way of the measuring structures may, e.g., be a joining tool, a coating device or a cutting device, and in particular a stamping or laser cutting device. Some process steps may be carried out in a defined position based on the measurement relative to such a measuring structure: e.g., positioning the two plates one on the other, positioning of the laser welding seams, positioning of the screen printing for partial coating etc.

A measuring structure of the type in question is known, e.g., from the published prior art DE102012002053A1, which is referred to as a measuring feature there. In a certain embodiment, the measuring feature according to DE102012002053A1 is a substantially circular depression, which is arranged in a raised section on the plate. Using known optical measuring systems, such rounded depressions may be easily localized, and the centers thereof ascertained. An optical measuring system for localizing this measuring structure comprises, e.g., a light source for illuminating the measuring structure, and an image detector for recording an image of the plate having the measuring structure arranged on the plate, wherein the light source and the camera may be arranged on the same side of the plate (reflected light method).

DE202015102771U1 relates to a metal plate for an electrochemical system including a measuring structure formed integrally with the plate. The measuring structure has at least two cuts in the plate, and a first deformation of the plate that is arranged between the cuts and delimited in sections by the cuts, wherein the cutting edges of the cuts spaced apart from one another in sections by the first deformation form at least two windows in the plate. The measuring structure furthermore has at least one second deformation of the plate. The plate is deformed by the second deformation in the area of the plate abutting the windows in such a way that the windows allow incident light on the plate to pass through perpendicularly to the planar surface plane of the plate. In order to locate this measuring structure, transmitted-light methods must be used, in which the light source and the image detector are arranged on different sides of the plate, so that the light emitted by the light source typically passes through the window in the plate perpendicularly to the flat surface plane of the plate and is detected by the image detector on the opposite side of the plate.

However, it has been found that it can be time-consuming to determine the alignment of the plate with the measuring structure relative to a further plate and/or relative to a tool for quality control purposes using the previously known measuring structures, and this can therefore have a disadvantageous effect on the efficiency and the cost of the production process.

The object of the innovation proposed here is therefore to provide a separator plate arrangement, suitable for use in an electrochemical system, which comprises a first metal sheet, a second metal sheet, and one or more measuring structures. The measuring structure or the measuring structures are intended to make it possible, in the largest possible number of production steps, to detect a misalignment of at least one of the metal sheets as easily and as quickly as possible in order thus to initiate, where necessary, a correction of the misalignment or a discarding.

This object is achieved by a separator plate arrangement for an electrochemical system according to claim 1 and a method according to the additional independent claim. Specific embodiments are described in the dependent claims.

A separator plate arrangement for an electrochemical system is proposed, comprising a first metal sheet and a second metal sheet which touch one another at least in part along the mutually facing flat sides thereof, wherein the first metal sheet has a first circumferential sealing structure for sealing off an electrochemically active region, a first cutout arranged outside of the first circumferential sealing structure, and a first embossed structure arranged outside of the first circumferential sealing structure, wherein the second metal sheet has a second circumferential sealing structure for sealing off an electrochemically active region, a second cutout arranged outside of the second circumferential sealing structure, and a second embossed structure arranged outside of the second circumferential sealing structure, wherein the second embossed structure is arranged at least in part in a region of the second metal sheet that is defined by a perpendicular projection of the first cutout onto the second metal sheet, so that the second embossed structure is visible through the first cutout, and wherein the first embossed structure is arranged at least in part in a region of the first metal sheet that is defined by a perpendicular projection of the second cutout onto the first metal sheet, so that the first embossed structure is visible through the second cutout.

Due to the fact that the first embossed structure is visible through the second cutout and that the second embossed structure is visible through the first cutout, the embossed structures can be detected from both sides of the separator plate arrangement, for example by means of an optical detector. A simultaneous detection from both sides is thus possible, as well as a simultaneous detection of both structures from just one side. This can considerably improve the speed and precision with which the alignment of at least one of the metal sheets in a tool or the alignment of the metal sheets relative to one another can be determined.

Here, an embossed structure is considered to be in particular a structure which extends transversely to a plane defined by one of the metal sheets, for example an inner radius or an outer radius or the edges delimiting such a radius.

The first metal sheet and the second metal sheet can be connected to one another or are connected to one another, for example by one or more materially bonded connections. By way of example, the first metal sheet and the second metal sheet may be welded to one another, for example by one or more welded joints, in particular by one or more laser-welded joints. In certain embodiments, the measuring structure can also be used to align the two metal sheets relative to one another prior to welding the two metal sheets to one another.

The first circumferential sealing arrangement may be formed in one piece with the first metal sheet. For example, the first circumferential sealing arrangement may be integrally formed in the first metal sheet in the form of a sealing bead, for example by embossing or by deep drawing. However, the first circumferential sealing arrangement may also be designed as an element different from the first metal sheet, which is connected to the first metal sheet.

Correspondingly, the second circumferential sealing arrangement may be formed in one piece with the second metal sheet. For example, the second circumferential sealing arrangement may be integrally formed in the second metal sheet in the form of a sealing bead, for example by embossing or by deep drawing. However, the second circumferential sealing arrangement may also be designed as an element different from the second metal sheet, which is connected to the second metal sheet.

Such elements which are different from the respective metal sheet, as well as coatings which are to be applied for example only to the sealing arrangements formed in one piece with the respective metal sheet, to parts of said sealing arrangements, or to the sealing arrangements as well as to a specific, spatially delimited, immediately adjacent region, can be positioned in a particularly precise manner by means of the measuring structure described here.

The first cutout may comprise a through-opening in the first metal sheet, and/or the second cutout may comprise a through-opening in the second metal sheet.

The first cutout may extend to an outer edge of the first metal sheet, so that the outer edge of the first metal sheet delimits the first cutout at least in part, and/or the second cutout may extend to an outer edge of the second metal sheet, so that the outer edge of the second metal sheet delimits the second cutout at least in part.

The first embossed structure may extent to the outer edge of the first metal sheet, and/or the second embossed structure may extend to the edge of the second metal sheet.

The first embossed structure may have at least one elevation which points entirely or at least partially in a direction facing away from the second metal sheet, and/or the second embossed structure may have at least one elevation which points entirely or at least partially in a direction facing away from the first metal sheet.

The first embossed structure may have at least one elevation which points entirely or at least partially in a direction facing towards the second metal sheet, and/or the second embossed structure may have at least one elevation which points entirely or at least partially in a direction facing towards the first metal sheet. The first embossed structure may then for example protrude through the second cutout, and/or the second embossed structure may then protrude through the first cutout.

In the region of the second metal sheet defined by the perpendicular projection of the first cutout onto the second metal sheet, the second metal sheet may have a cutout, which may be in the form of a through-opening of the second metal sheet, besides or in addition to the second embossed structure, and/or, in the region of the first metal sheet defined by the perpendicular projection of the second cutout onto the first metal sheet, the first metal sheet may have a cutout, which may be in the form of a through-opening of the first metal sheet, besides or in addition to the first embossed structure. The embossed structures and cutouts may therefore be arranged very close to one another.

Said cutout in the first metal sheet in the region defined by the perpendicular projection of the second cutout onto the first metal sheet will be referred to hereinafter as the third cutout. Said cutout in the second metal sheet in the region defined by the perpendicular projection of the first cutout onto the second metal sheet will be referred to hereinafter as the fourth cutout. The third cutout and/or the fourth cutout may each be designed for example as a through-opening or indentation, for example an indentation in the outer edge, in the respective metal sheet.

It may be advantageous if a cut edge of the third cutout is visible through the second cutout, and/or a cut edge of the fourth cutout is visible through the first cutout. By virtue of a double structure reciprocally arranged in this way, an optical detection of the first embossed structure or of the cut edge of the third cutout and/or of the second embossed structure or of the cut edge of the fourth cutout can take place through the second metal sheet or through the first metal sheet, respectively.

For instance, for some monitoring assemblies, it may be desirable that the embossed structure of the top metal sheet can be detected through the bottom metal sheet. For example, in a screen printing process, for example for applying a coating, it may be necessary that a monitoring camera, for space reasons, is not arranged on the side of the plate arrangement where the screen printing takes place. This requirement can be achieved by providing the third cutout and/or the fourth cutout.

In some embodiments, the third cutout is formed at least partially or entirely inside of the first embossed structure. The first embossed structure may thus surround the third cutout, for example at least partially or entirely. It would be conceivable, for example, that the third cutout and a centroid and/or centre point of the first embossed structure overlap. The third cutout and the first embossed structure are sometimes arranged concentrically and/or symmetrically with respect to a common axis of symmetry and/or plane of symmetry.

As an alternative or in addition, the fourth cutout may be formed at least partially or entirely inside of the second embossed structure. The second embossed structure may thus surround the fourth cutout, for example at least partially or entirely. In addition or as an alternative, the fourth cutout and a centroid or centre point of the second embossed structure may overlap. The fourth cutout and the second embossed structure are sometimes arranged concentrically and/or symmetrically with respect to a common axis of symmetry and/or plane of symmetry.

A surface area of the third cutout and/or of the fourth cutout within the respective projection is usually smaller than a surface area of the area enclosed by the associated embossed structure. The third cutout and/or the fourth cutout may have a geometric shape which differs from a geometric shape of the associated embossed structure. If, for example, the respective embossed structure is circular, the associated cutout may have a shape differing therefrom. In some embodiments, the third cutout and/or the fourth cutout are each designed as a slot (elongated hole). If both a third and a fourth cutout are in the shape of an oval or a slot (elongated hole), these may for example be arranged with a different orientation relative to one another. In an alternative embodiment, the third cutout and the first embossed structure have an identical geometric shape. Sometimes the fourth cutout and the second embossed structure have an identical geometric shape. It should be noted here that, in the context of this document, objects may have the same geometric shape even when they have a different size (for example two differently sized circles have the same shape but a different size). Correspondingly, objects having a different geometric shape may have the same size, for example the same surface area.

A perpendicular projection of the first cutout onto a plane defined by the first metal sheet or by the second metal sheet and a perpendicular projection of the second cutout onto said plane may overlap one another at least in part.

The first embossed structure may have a symmetry with respect to a first plane of symmetry or with respect to a first axis of symmetry, wherein the first plane of symmetry or the first axis of symmetry is oriented perpendicular to a first sheet plane defined by the first metal sheet, and/or the second embossed structure may have a symmetry with respect to a second plane of symmetry or with respect to a second axis of symmetry, wherein the second plane of symmetry or the second axis of symmetry is oriented perpendicular to a second sheet plane defined by the second metal sheet.

The first embossed structure may then have for example an integer or continuous rotational symmetry with respect to the first axis of symmetry, and/or the second embossed structure may then have for example an integer or continuous rotational symmetry with respect to the second axis of symmetry.

The corresponding axis of symmetry and/or at least a portion of the plane of symmetry may be visible through the corresponding cutout since the axis of symmetry and the plane of symmetry form reference points and reference planes for the relative measurement of the embossed structures.

The first metal sheet may have one embossed structure extending around the first cutout or a plurality of embossed structures arranged around the first cutout, and/or the second metal sheet may have one embossed structure extending around the second cutout or a plurality of embossed structures arranged around the second cutout. In this case, "extending around" does not mean that the cutout must be entirely surrounded by an embossed structure, but rather the cutout may be surrounded by the embossed structure in part, for example over a proportion of ⅔ or ¾.

Furthermore, the first metal sheet may have a further cutout arranged outside of the first circumferential sealing structure and a further embossed structure arranged outside of the first circumferential sealing structure, and the second metal sheet may have a further cutout arranged outside of the second circumferential sealing structure and a further embossed structure arranged outside of the second circumferential sealing structure. The further embossed structure of the second metal sheet may then be arranged at least in part in a region of the second metal sheet that is defined by a perpendicular projection of the further cutout of the first metal sheet onto the second metal sheet, so that the further embossed structure of the second metal sheet is visible through the further cutout of the first metal sheet. Likewise, the further embossed structure of the first metal sheet may then be arranged at least in part in a region of the first metal sheet that is defined by a perpendicular projection of the further cutout of the second metal sheet onto the first metal sheet, so that the further embossed structure of the first metal sheet is visible through the further cutout of the second metal sheet.

Since the two embossed structures belong to one component arranged in a plane, namely the first metal sheet, locating for example the two embossed structures of the first metal sheet through the cutouts of the second metal sheet makes it possible to determine in full the position of the first metal sheet. If the embossed structures are integrally formed in the relevant metal sheet in the same forming step as the sealing beads and/or the webs of the active region, then the position of the sealing beads and/or of the webs of the active region of the relevant metal sheet can be determined through the second metal sheet based on the position of the two embossed structures. This enables for example an optimized application of a partial coating to the sealing beads or in the active region, in particular in selected areas of the active region. Alternatively, if sealing arrangements are merely applied, then the position of application thereof relative to the embossed structures can be determined in the same way. The embossed structures and cutouts thus make it possible to locate elements of the first metal sheet from the side of the separator plate on which the second metal sheet is arranged, that is to say from the side of the separator plate from which said elements per se are not visible. The same applies conversely to embossed structures of the second metal sheet, the position of which can be determined via the position of the two embossed structures of the second metal sheet, which can be detected through the cutouts of the first metal sheet.

The first metal sheet and the second metal sheet may each have a rectangular or substantially rectangular shape, e.g. with rounded corners, with a length and a width, wherein the width is in each case smaller than or equal to the length. A smallest distance of the first embossed structure from the further embossed structure of the first metal sheet may then be for example at least 80 percent, or at least 90 percent, of the width of the first metal sheet, and/or a smallest distance of the second embossed structure from the further embossed structure of the second metal sheet may then be for example at least 80 percent, or at least 90 percent, of the width of the second metal sheet. The width may be based here on the maximum width or else only on the total width of the metal sheet in the electrochemically active region.

The first metal sheet and the second metal sheet may therefore each have a rectangular or substantially rectangular shape, e.g. with rounded corners, with a length and a width, wherein the width is in each case smaller than or equal to the length, and the length is therefore in each case larger than or equal to the width. A smallest distance of the first embossed structure from the further embossed structure of the first metal sheet may then be for example at least 80 percent, or at least 90 percent, of the length of the first metal sheet, and/or a smallest distance of the second embossed structure from the further embossed structure of the second metal sheet may then be for example at least 80 percent, or at least 90 percent, of the length of the second metal sheet.

A centroid of the first embossed structure in a plane defined by the first or by the second metal sheet may be defined by a perpendicular projection of the first embossed structure onto said plane. A centroid of the second embossed structure in said plane may be defined by a perpendicular projection of the second embossed structure onto said plane. A centroid of the further embossed structure of the first metal sheet in said plane may be defined by a perpendicular projection of the further embossed structure of the first metal sheet onto said plane. And a centroid of the further embossed structure of the second metal sheet in said plane may be defined by a perpendicular projection of the further embossed structure of the second metal sheet onto said plane. In certain embodiments, the centroids coincide with the aforementioned axes of symmetry or planes of symmetry. Furthermore, a distance and a maximum tolerance value may be specified. An actual distance of the centroid of the first embossed structure from the centroid of the second embossed structure then may deviate from the specified distance by less than the specified maximum tolerance value, and an actual distance of the centroid of the further embossed structure of the first metal sheet from the centroid of the further embossed structure of the second metal sheet then may deviate from the specified distance by less than the specified maximum tolerance value.

The first metal sheet may also have at least three spaced-apart cutouts arranged outside of the first circumferential sealing structure and at least three spaced-apart embossed structures arranged outside of the first circumferential sealing structure. Likewise, the second metal sheet may have at least three spaced-apart cutouts arranged outside of the second circumferential sealing structure and at least three spaced-apart embossed structures arranged outside of the second circumferential sealing structure. The metal sheets may then be arranged and designed such that each of the at least three embossed structures of the second metal sheet is arranged at least in part in a region of the second metal sheet that is defined by a perpendicular projection of one of the at least three cutouts of the first metal sheet onto the second metal sheet, so that in each case at least one of the at least three embossed structures of the second metal sheet is visible through each of the at least three cutouts of the first metal sheet, and such that each of the at least three embossed structures of the first metal sheet is arranged at least in part in a region of the first metal sheet that is defined by a perpendicular projection of one of the at least three cutouts of the second metal sheet onto the first metal sheet, so that in each case at least one of the at least three embossed structures of the first metal sheet is visible through each of the at least three cutouts of the second metal sheet.

Steps of a method for producing an above-described separator plate arrangement will be described below.

According to a first embodiment, such a method for producing such a separator plate arrangement may comprise for example at least the following steps:

punching a first cutout out of a first metal sheet in a first tool, embossing a first embossed structure, adjacent to the first cutout, into the first metal sheet in a second tool, punching a second cutout out of a second metal sheet in a third tool, embossing a second embossed structure, adjacent to the second cutout, into the second metal sheet in a fourth tool, and positioning the first metal sheet and the second metal sheet one on top of the other such that:
  the first metal sheet and the second metal sheet touch one another at least in part along the mutually facing flat sides thereof and
  the first embossed structure of the first metal sheet is arranged at least in part in a region that is defined by a perpendicular projection of the second cutout of the second metal sheet onto the first metal sheet and
  the second embossed structure of the second metal sheet is arranged at least in part in a region that is defined by a perpendicular projection of the first cutout of the first metal sheet onto the second metal sheet.

According to a second embodiment, such a method for producing such a separator plate arrangement may additionally comprise for example at least the following steps:

punching a further cutout out of the first metal sheet in the first tool, embossing a further embossed structure, adjacent to the further cutout, into the first metal sheet in the second tool, punching a further cutout out of the second metal sheet in the third tool, embossing a further embossed structure, adjacent to the further cutout, into a second metal sheet in the fourth tool, and positioning the first metal sheet and the second metal sheet one on top of the other so that:
  the first metal sheet and the second metal sheet touch one another at least in part along the mutually facing flat sides thereof and
  the further embossed structure of the first metal sheet is arranged at least in part in a region that is defined by a perpendicular projection of the further cutout of the second metal sheet onto the first metal sheet and the further embossed structure of the second metal sheet is arranged at least in part in a region that is defined by a perpendicular projection of the further cutout of the first metal sheet onto the second metal sheet.

According to a third embodiment, such a method for producing such a separator plate arrangement may additionally comprise for example at least the following steps:

contactlessly detecting a distance of a first reference point from a second reference point, wherein the first reference point is determined on the basis of the first embossed structure of the first metal sheet, and wherein the second reference point is determined on the basis of the second embossed structure of the second metal sheet, and contactlessly detecting a distance of a third reference point from a fourth reference point, wherein the first reference point is determined on the basis of the further embossed structure of the first metal sheet, and wherein the fourth reference point is determined on the basis of the further embossed structure of the second metal sheet, if a deviation of the distances detected above is not greater than a respectively defined maximum distance, connecting the first metal sheet to the second metal sheet.

According to a fourth aspect, as an alternative to the third aspect but in addition to the first and second aspect, such a method for producing such a separator plate arrangement may comprise for example at least the following steps:

embossing at least one bead into the first metal sheet in the second tool, contactlessly detecting a distance of a first reference point from a second reference point, wherein the first reference point is determined through the second cutout of the second metal sheet on the basis of the first embossed structure of the first metal sheet, and wherein the second reference point is determined through the further cutout of the second metal sheet on the basis of the further embossed structure of the first metal sheet, and if a deviation of the distance detected above is not greater than a defined maximum distance, coating the first metal sheet on the surface facing away from the second metal sheet in the region of the at least one bead.

In the method, the embossing of a bead and the coating may also be replaced by the application, for example by means of injection moulding, of a sealing arrangement, for example an applied, e.g. molded-on sealing bead or another sealing profile. This eliminates the embossing of the bead(s), but not the embossing of the other structures.

According to a fifth aspect, as an alternative to the third and fourth aspect but in addition to the first and second aspect, such a method for producing such a separator plate arrangement may comprise for example at least the following steps:

embossing the webs of the active region into the first metal sheet in the second tool, contactlessly detecting a distance of a first reference point from a second reference point, wherein the first reference point is determined through the second cutout of the second metal sheet on the basis of the first embossed structure of the first metal sheet, and wherein the second reference point is determined through the further cutout of the second metal sheet on the basis of the further embossed structure of the first metal sheet, and if a deviation of the distance detected above is not greater than a defined maximum distance, coating the first metal sheet on the surface facing away from the second metal sheet in the region of the webs of the active region.

If, in the methods according to the third to fifth aspect, the detected distances are greater than the defined maximum distances, at least one metal sheet is shifted and the relevant distance(s) are contactlessly detected again until the deviation is not greater than the respectively defined maximum distance.

Further steps may comprise: punching a third cutout out of the first metal sheet, for example in the first tool, and/or punching a fourth cutout out of the second metal sheet, for example in the third tool. The third cutout may be punched out of the first metal sheet at the same time as the first cutout. The fourth cutout may be punched out of the second metal sheet at the same time as the second cutout.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

Embodiments of an electrochemical system comprising separator plate assemblies of the type proposed here are shown in the figures and will be described in greater detail on the basis of the following description. In the figures:

FIG. 4 schematically shows a separator plate arrangement of the type proposed here, in a plan view;

FIG. 5A schematically shows a section through a detail of the separator plate arrangement shown in FIG. 4;

FIG. 5B schematically shows the detail according to FIG. 5A in a first plan view;

FIG. 5C schematically shows the detail according to FIG. 5A in a second plan view;

FIG. 6A schematically shows a section through a detail of the separator plate arrangement of FIG. 4 according to a modification;

FIG. 6B schematically shows the detail according to FIG. 6A in a first plan view;

FIG. 6C schematically shows the detail according to FIG. 6A in a second plan view;

FIG. 7 schematically shows two perspective views of a detail of the separator plate arrangement of FIG. 4 according to a further modification;

FIGS. 8A, 8B each schematically show two perspective views of a detail of the separator plate arrangement of FIG. 4 according to further modifications;

FIG. 8C schematically shows a section through the detail of FIGS. 8A and 8B;

FIGS. 9-11 each schematically show two perspective views of a detail of the separator plate arrangement of FIG. 4 according to further modifications;

FIG. 12 schematically shows a detail of the separator plate arrangement of FIG. 4 according to a further modification, in a plan view;

FIGS. 1-16C are shown approximately to scale.

DETAILED DESCRIPTION

Figure 1:
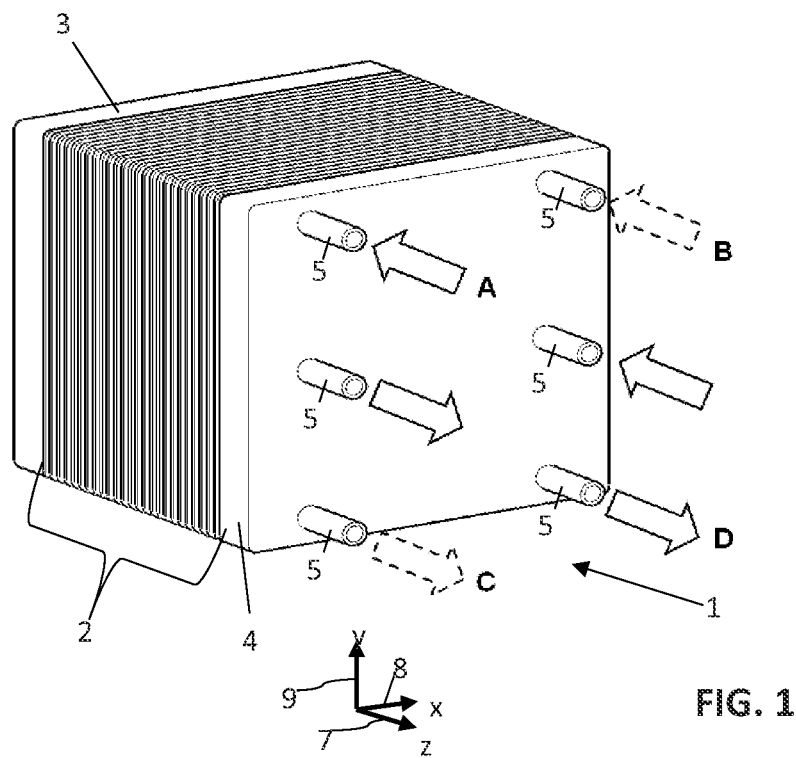
FIG. 1 schematically shows, in a perspective view, an electrochemical system comprising a plurality of separator plates or bipolar plates arranged in a stack.

FIG. 1 shows an electrochemical system 1 comprising a plurality of identical metal separator plates or bipolar plates 2 which are arranged in a stack and are stacked along a z-direction 7. The separator plates 2 of the stack are clamped between two end plates 3, 4. The z direction 7 is also called the stacking direction. In the present example, the system 1 is a fuel cell stack. Two adjacent separator plates 2 of the stack in each case thus enclose between them an electrochemical cell, which is used, e.g., for converting chemical energy into electrical energy. In order to form the electrochemical cells of the system 1, a respective membrane electrode assembly (MEA) is arranged between adjacent separator plates 2 of the stack (see e.g., FIG. 2). The MEAs typically each contain at least one membrane, e.g., an electrolyte membrane. Furthermore, a gas diffusion layer (GDL) may be arranged on one or both surfaces of the MEA.

In alternative embodiments, the system 1 may likewise be formed as an electrolyzer, an electrochemical compressor, or as a redox flow battery. Separator plates may likewise be used in these electrochemical systems. The composition of these separator plates may then correspond to the composition of the separator plates 2 that are explained in greater detail here, even if the media guided on or through the separator plates in the case of an electrolyzer, in the case of an electrochemical compressor, or in the case of a redox flow battery, may in each case differ from the media used for a fuel cell system. The same applies to the separator plates, in particular of a humidifier.

Together with an x-axis 8 and a y-axis 9, the z-axis 7 spans a right-handed Cartesian coordinate system. The separator plates 2 in each case define a plate plane, wherein the plate planes of the separator plates are each aligned parallel to the x-y plane, and thus perpendicular to the stacking direction or to the z-axis 7. The end plate 4 includes a plurality of media connections 5, via which media are suppliable to the system 1 and via which media are dischargeable out of the system 1. These media that may be supplied to the system 1 and discharged out of the system 1 may, e.g., include fuels such as molecular hydrogen or methanol, reaction gases such as air or oxygen, reaction products such as water vapor, or depleted fuels or coolants such as water and/or glycol.

Figure 2:
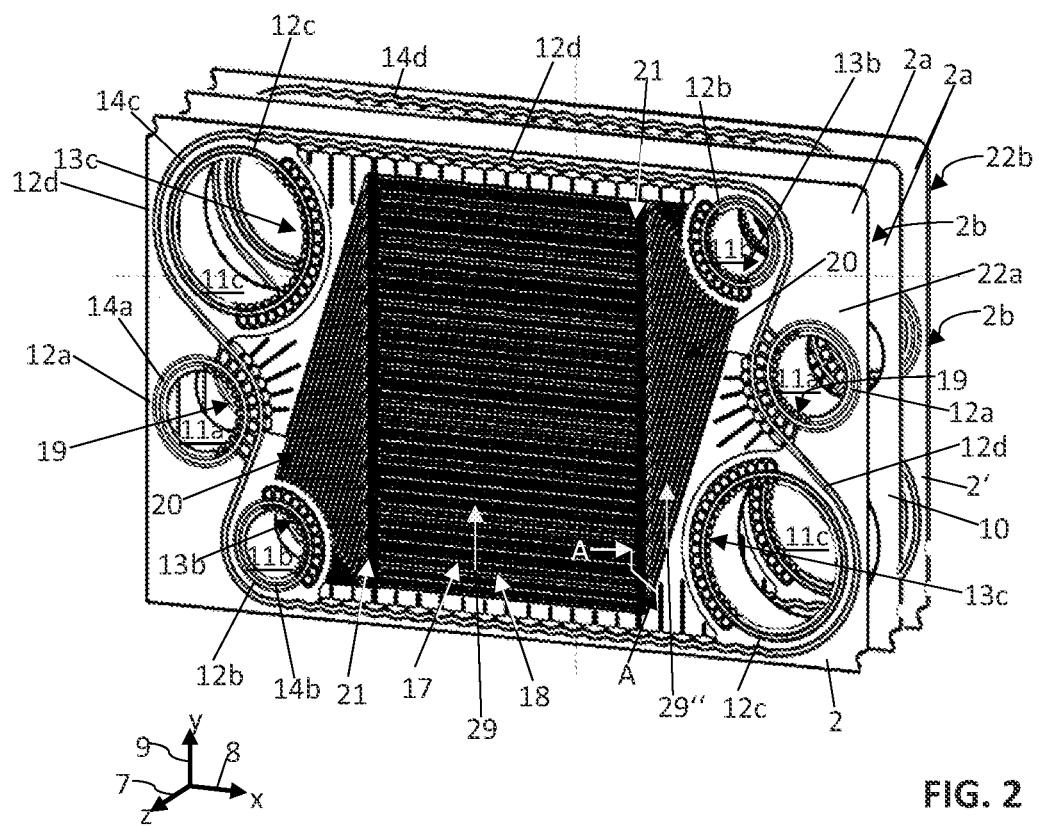
FIG. 2 schematically shows, in a perspective view, two separator plates of the system shown in FIG. 1, with a membrane electrode unit (membrane electrode assembly, MEA) arranged between the separator plates.

FIG. 2 shows a perspective view of two adjacent separator plates or bipolar plates 2 of an electrochemical system of the type of the system 1 from FIG. 1, as well as a membrane electrode assembly (MEA) 10, which is known from the related art, arranged between these adjacent separator plates 2, wherein the MEA 10 in FIG. 2 is largely hidden by the separator plate 2 facing the observer. Here and hereafter, recurring features are each designated with the same reference numerals in different figures. The separator plate 2 is formed from two integrally joined individual plates 2a, 2b (see e.g., FIG. 3), of which only the first individual plate 2a facing the observer is visible in FIG. 2, which hides the second individual plate 2b. The individual plates 2a, 2b may be made of sheet metal, such as stainless-steel sheet. The individual plates 2a, 2b may, e.g., be welded together, e.g., by laser welded connections.

The individual plates 2a, 2b have mutually aligned through-openings, which form through-openings 11a-c of the separator plate 2. When a plurality of separator plates of the type of separator plate 2 are stacked, the through-openings 11a-c form ducts extending through the stack 2 in the stacking direction 7 (see FIG. 1). Typically, each of the ducts formed by the through-openings 11a-c is in fluid connection with one of the ports 5 in the end plate 4 of the system 1. Coolant may, e.g., be introduced into the stack or removed from the stack via the ducts formed by the through-openings 11a. The lines formed by the through-openings 11b, 11c, on the other hand, may be designed to supply the electrochemical cells of the fuel cell stack of the system 1 with fuel and with reaction gas, as well as to conduct the reaction products out of the stack.

In order to seal off the through-openings 11a-c with respect to other regions of the respective individual plate or the electrochemical cell adjoining the latter, and also with respect to the surrounding environment, the first individual plates 2a each have sealing arrangements 12a-c, here in the form of sealing beads, which are each arranged around the through-openings 11a-c and in each case entirely surround the through-openings 11a-c and are provided with a coating 14a-c all the way around on their end face, which coating improves the micro-sealing effect. On the rear side of the separator plates 2, facing away from the viewer of FIG. 2, the second individual plates 2b have corresponding sealing beads for sealing off the through-openings 11a-c (not shown).

In an electrochemically active area 18, the first individual plates 2a, at the front side thereof facing the observer of FIG. 2, include a flow field 17 including structures for guiding a reaction medium along the front side of the individual plate 2a. In FIG. 2, these structures are defined by a plurality of webs and channels extending between the webs and delimited by the webs. Usually, at least the end faces of these webs are provided with a coating which improves the conductivity. This coating may only be applied on the surfaces of the individual plates facing the MEA. This may be applied in a method step separate from the forming steps. With regard to the usually very high costs of said coating, the coating should be applied as precisely as possible, that is to say without any offset or with only a minimal offset relative to the embossed shape of the webs. This makes it possible to operate with the smallest possible excess, that is to say lateral overhang, of coating.

On the front side of the separator plates 2, facing towards the viewer of FIG. 2, the first individual plates 2a additionally each have a distribution or collection region 20. The distribution or collection area 20 includes structures that are configured to distribute a medium that, proceeding from a first of the two through-openings 11b, is introduced into the distribution or collection area 20 across the active area 18 and/or to collect or to pool a medium that, proceeding from the active area 18, flows toward the second of the through-openings 11b. The distribution structures of the distribution or collection area 20 in FIG. 2 are likewise provided by webs, and channels extending between the webs and delimited by the webs. A respective transition region 21, which in FIG. 2 is aligned parallel to they direction 9, is located on both sides of the flow field 17 at the transition between the distribution and collection region 20 and the flow field 17 of the active area 18. In the transition region 21, the media guidance structures in each case have a reduced height, e.g., compared to the adjacent areas 18 and 20 (see FIG. 3). Comparable distribution and/or collection areas are preferably given on the second individual plate 2b which is hidden by the first individual plate 2a.

The first individual plates 2a each also have a further sealing arrangement in the form of a perimeter bead 12d which extends around the flowfield 17 of the active region 18, the distribution or collection region 20 and the through-openings 11b, 11c and seals these off with respect to the through-opening 11a, that is to say with respect to the coolant circuit, and with respect to the environment surrounding the system 1. The perimeter bead is provided with a coating 14d all the way around on its end face, which coating improves the micro-sealing effect. The second individual plates 2b each comprise corresponding perimeter beads. The structures of the active area 18, the distribution structures of the distribution or collection area 20 and the sealing beads 12a-d are each formed in one piece with the individual plates 2a and integrally formed in the individual plates 2a, e.g., in an embossing or deep drawing process. The same applies to the corresponding distributing structures and sealing beads of the second individual plates 2b. Outside of the region enclosed by the perimeter bead 12d, the individual plates 2a, 2b have a predominantly unstructured outer edge region 22a, 22b.

Usually at least the end faces of these sealing beads, including of the perimeter bead, that is to say of the beads 12a to 12d, are provided with a coating which is usually polymer-based and which improves the micro-sealing effect. This may be applied in a method step separate from the forming steps. The micro-sealing should be applied as precisely as possible, that is to say without any offset or with only a minimal offset relative to the embossed shape of the sealing bead.

The two through-openings 11b or the lines through the plate stack of the system 1 that are formed by the through-openings 11b are each fluidically connected to one another via passages 13b in the sealing beads 12b, via the distributing structures of the distribution or collection region 20 and via the flowfield 17 in the active region 18 of the first individual plates 2a facing towards the viewer of FIG. 2. Similarly, the two through-openings 11c or the ducts formed by the through-openings 11c through the plate stack of the system 1 are each in fluid connection with one another via corresponding bead passages, via corresponding distribution structures, and via a corresponding flow field on an outer side of the second individual plates 2b facing away from the observer of FIG. 2. In contrast, for example, the through-openings 11a or the ducts formed by the through-openings 11a through the plate stack of the system 1 are each in fluid connection with one another via a cavity 19 that is enclosed or surrounded by the individual plates 2a, 2b. This cavity 19 is used for guiding a coolant through the separator plate 2, and in particular for cooling the electrochemically active area 18 of the separator plate 2.

Figure 3:
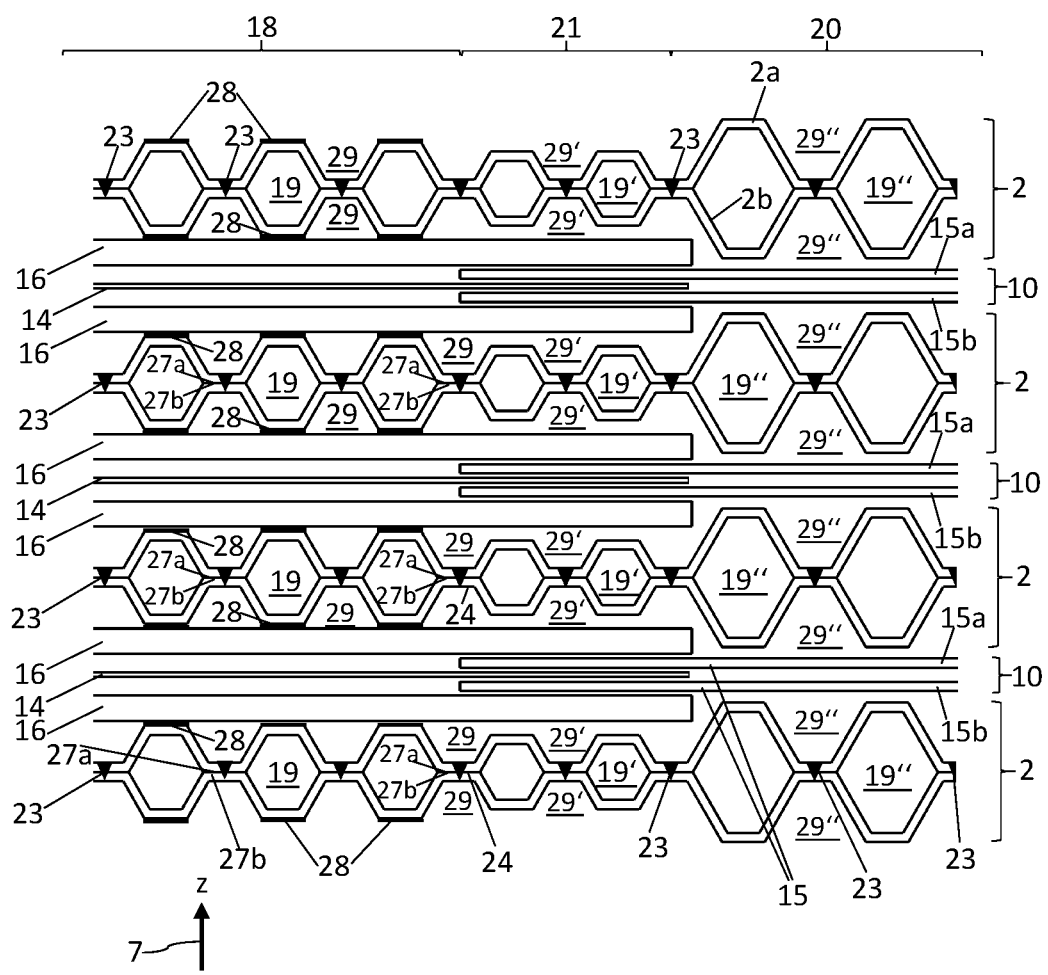
FIG. 3 schematically shows a section through a plate stack of a system according to the type of system shown in FIG. 1.

FIG. 3 schematically shows a sectional view through a section of the plate stack of the system 1 from FIG. 1, wherein the cutting plane is oriented in the z direction, and thus perpendicular to the plate planes of the separator plates 2; for example, it may extend along the bent section A-A in FIG. 2. The identical separator plates 2 of the stack each comprise the above-described first metal individual plate 2a, and the above-described second metal individual plate 2b. Also labelled are the active region 18, the transition region 21 and the distribution or collection region 20 of the separator plates 2, wherein the regions 18, 21, 20 each have structures for conducting media along the outer faces of the separator plates 2, here in particular in each case in the form of webs and channels delimited by the webs. In the active region 18, the webs are provided on their surface with a coating 28 which improves the conductivity, which coating is applied as far as possible only to the surface of the webs and not to the obliquely extending channel walls or even the channel bottom, as shown in the present example. Channels 29 on the surfaces of adjoining individual plates 2a, 2b that point away from one another are also shown in the active region 18, as well as cooling channels 19 between adjoining individual plates 2a, 2b. Analogously, channels 29', 19' are shown in the transition region 21, and channels 29", 19" are shown in the distribution or collection region 20. Between the cooling channels 19, 19', 19", the two individual plates 2a, 2b are located on top of one another in a contact area 24, and are connected there to one another, in the present example this being by way of laser weld seams 23.

A respective membrane electrode assembly (MEA) 10, which is known from the related art, e.g., is arranged between adjacent separator plates 2 of the stack. Each of the MEA 10 comprises a membrane 14, e.g., an electrolyte membrane, and an edge section 15 connected to the membrane 14, which is composed of two edge seals 15a, 15b here. For example, the edge section 15, or the edge seals 15a, 15b, may each be integrally joined to the membrane 14, e.g., by an adhesive bond or by lamination. The edge section 15 is formed from a film material, e.g., from a thermoplastic film material or from a thermoset film material.

The membrane 14 of the MEA 10 extends in each case at least across the active area 18 of the abutting separator plates 2, where it enables a proton transfer via or through the membrane 14. Moreover, the membrane 14 extends at least partially into the transition area 21, but not into the distribution or collection area 20. The edge section 15 of the MEA 10 is used in each case for positioning, attaching, and sealing the membrane 14 between the abutting separator plates 2. When the separator plates 2 of the system 1 are clamped in the stacking direction between the end plates 3, 4 (see FIG. 1), the edge section 15 of the MEA 10 may, for example, be pressed between the sealing beads 12a-d of the respective abutting separator plates 2 and/or at least between the perimeter beads 12d of the abutting separator plates 2, so as to fix the membrane 14 between the abutting separator plates 2 in this way.

The edge section 15 covers the respective distribution or collection area 20 of the abutting separator plates 2. As is shown in FIG. 3, the edge section 15 may additionally also completely or at least partially cover the transition area 21 of the abutting separator plates 2, or completely or at least partially extend into the transition area 21 of the abutting separator plates 2 (see FIG. 2). Toward the outside, the edge section 15 may also extend beyond the perimeter bead 12d, where it may abut the outer edge area 22 of the individual plates 2a, 2b (see FIG. 2).

As is shown in FIG. 3, gas diffusion layers 16 may additionally be arranged in the active area 18. The gas diffusion layers 16 allow incident flow of the membrane 14 across as large an area of the surface of the membrane 14 as possible and may thus improve the proton transfer via the membrane 14. The gas diffusion layers 16 may, e.g., be arranged on both sides of the membrane 14 in the active area 18 between the abutting separator plates 2. The gas diffusion layers 16 may for example be formed of a nonwoven or may comprise a nonwoven.

In the section of the exemplary embodiment that is shown in FIG. 3, the two metal sheets 2a, 2b are optimally positioned one on top of the other. On the one hand, this results in the greatest possible bearing of their mutually facing end faces 27a, 27b of the active region 18, which enables particularly easy and durable welding. On the other hand, this creates the shape of the cooling channels 19. If the end faces 27a, 27b were to be shifted relative to one another, this would possibly make it more difficult to weld the metal sheets 2a, 2b to one another and the coolant would flow differently, so that in some cases there would be only insufficient cooling.

FIG. 4 schematically shows, in a plan view, a separator plate arrangement 100 of the type proposed here. The separator plate arrangement 100 is designed for use in an electrochemical system of the same type as the electrochemical system 1 shown in FIG. 1. In the system 1, separator plate assemblies of the same type as the separator plate arrangement 100 may for example in each case replace the separator plates or bipolar plates 2 shown in FIGS. 1-3.

Like the separator plates or bipolar plates 2 shown in FIGS. 1-3, the separator plate arrangement 100 shown in FIG. 4 comprises in each case a first metal sheet 100a and a second metal sheet 100b. The metal sheets 100a, 100b are oriented parallel to one another and parallel to the x-y plane. In the plan view of FIG. 4, the second metal sheet 100b is almost entirely hidden by the first metal sheet 100a, which faces towards the viewer. The metal sheets 100a, 100b touch one another at least in part along the mutually facing flat sides thereof. Like the individual plates 2a, 2b of the separator plates 2 shown in FIGS. 1-3, the metal sheets 100a, 100b of the separator plate arrangement are typically connected to one another, for example via a materially bonded connection. By way of example, the metal sheets 100a, 100b may be welded to one another, for example via one or more laser-welded joints.

The metal sheets 100a, 100b may have all, at least some or one of the features of the individual plates 2a, 2b of the separator plates or bipolar plates 2 which are shown in FIGS. 1-3 and which have been explained with reference to FIGS. 1-3. Merely for the sake of better clarity, only some of these features are highlighted by reference signs in FIG. 4. Like the individual plates 2a, 2b shown in FIGS. 1-3, the metal sheet 100a facing towards the viewer of FIG. 4 comprises, inter alia, an electrochemically active region 18 with structures for guiding a reaction medium along the front side of the metal sheet 100a, here in the form of webs and channels arranged between the webs, through-openings 11a-c, sealing arrangements 12a-d, here in the form of sealing beads integrally formed in the metal sheet 100a, and passages 13a, 13b through the sealing arrangements 12a, 12b. In alternative embodiments, the sealing arrangements 12a-d of the metal sheet 100a may also be defined by elements which are different from the metal sheet 100a and which are connected to the metal sheet 100a. The sealing arrangement 12d extends all the way around the active region 18 and serves for sealing off the active region 18, in particular with respect to the surrounding environment and with respect to other regions of the electrochemical system 1. The second metal sheet 100b, which in FIG. 4 is substantially hidden by the first metal sheet 100a, may have features corresponding to the features of the first metal sheet 100a, but passages 13c through the bead 12c are present instead of passages 13b through the bead 12b. In certain embodiments, the second metal sheet 100b may thus likewise have an electrochemically active region corresponding to the electrochemically active region 18, through-openings corresponding to the through-openings 11a-c, sealing beads corresponding to the sealing beads 11a-c, and a perimeter bead 12d with a coating 14a-d again applied to the end face thereof.

The separator plate arrangement 100 shown in FIG. 4 differs from the known separator plates 2 shown in FIGS. 1-3 in that the first metal sheet 100a additionally has cutouts 30a, 31a and embossed structures 32a, 33a embossed into the first metal sheet 100a, which are each arranged outside of the sealing arrangement 12d extending around the electrochemically active region 18, that is to say on a side of the sealing arrangement 12d that is remote from the active region 18. The cutouts 30a, 31a of the first metal sheet 100a are designed as through-openings in the first metal sheet 100a and are each at a distance from an outer edge 25a of the first metal sheet 100a. The second metal sheet 100b has cutouts 30b, 31b, which correspond to the cutouts 30a, 31a of the first metal sheet 100a and which in FIG. 4 are hidden by the first metal sheet 100a, and embossed structures 32b, 33b, which correspond to the embossed structures 32a, 33a of the first metal sheet 100a and which are visible through the cutouts 30a, 31a and are likewise arranged outside of a circumferential sealing arrangement (peripheral sealing arrangement) for sealing off an electrochemically active region of the second metal sheet 100b. Like the cutouts 30a, 31a of the first metal sheet 100a, said cutouts 30b, 31b of the second metal sheet 100b, which are hidden in FIG. 4, are designed as through-openings in the second metal sheet 100b and are each at a distance from the outer edge of the second metal sheet 100b.

FIGS. 5A-C schematically show a detail of the separator plate arrangement 100 shown in FIG. 4, wherein the detail shown comprises the cutout 30a and the embossed structure 32a of the first metal sheet 100a and also the cutout 30b and the embossed structure 32b of the second metal sheet 100b. FIG. 5A shows the detail in a sectional view, wherein the sectional plane is oriented along the y-z axis and extends along the sectional straight line 26 indicated in FIGS. 4, 5B and 5C. FIG. 5B shows the detail in a plan view, the viewing direction pointing in the negative z-direction 7. And FIG. 5C shows the detail in a further plan view, the viewing direction pointing in the positive z-direction 7 and thus in a direction opposite to the viewing direction of FIG. 5B.

It can be seen from FIGS. 5A and 5B that the cutout 30a of the first metal sheet 100a and the embossed structure 32b of the second metal sheet 100b are arranged and designed such that the embossed structure 32b is arranged in a region of the second metal sheet 100b that is defined by a perpendicular projection of the cutout 30a of the first metal sheet 100a onto the second metal sheet 100b, so that the embossed structure 32b of the second metal sheet 100b, as viewed in the negative z-direction 7, is visible through the cutout 31a of the first metal sheet 100a. Likewise, it can be seen from FIGS. 5A and 5C that the cutout 30b of the second metal sheet 100b and the embossed structure 32a of the first metal sheet 100a are arranged and designed such that the embossed structure 32a is arranged in a region of the first metal sheet 100a that is defined by a perpendicular projection of the cutout 30b of the second metal sheet 100b onto the first metal sheet 100a, so that the embossed structure 32a of the first metal sheet 100a, as viewed in the positive z-direction 7, is visible through the cutout 31b of the second metal sheet 100b.

The perpendicular projection of the cutout 30a of the first metal sheet 100a onto the second metal sheet 100b takes place along the negative z-direction 7 and thus along a direction perpendicular to the second metal sheet 100b or perpendicular to a plane defined by the second metal sheet 100b, which may be defined for example by non-deformed or non-embossed flat regions 22b of the second metal sheet 100b and is oriented here parallel to the x-y plane. Likewise, the perpendicular projection of the cutout 30b of the second metal sheet 100b onto the first metal sheet 100a takes place along the positive z-direction 7 and thus along a direction perpendicular to the first metal sheet 100a or perpendicular to a plane defined by the first metal sheet 100a, which may be defined for example by non-deformed or non-embossed flat regions 22a of the first metal sheet 100a and is oriented here parallel to the x-y plane.

The cutout 30a of the first metal sheet 100a is delimited and bordered by a circular edge 33a, so that the cutout 30a forms a circular through-opening or a circular through-hole in the first metal sheet 100a. The embossed structure 32b of the second metal sheet 100b, which is visible through the cutout 30a, likewise has a circular shape. The embossed structure 32b of the second metal sheet 100b comprises an elevation which points in a direction facing away from the first metal sheet 100a. In certain embodiments, the embossed structure 32b comprises a ring-shaped flank 34b and a circular flat plateau 35b bordered by the ring-shaped flank 34b. The cutout 30a and the embossed structure 32b are arranged concentrically and symmetrically with respect to a common axis of symmetry 36, which is perpendicular to the parallel metal sheets 100a, 100b. In certain embodiments, the cutout 30a and the embossed structure 32b have a continuous rotational symmetry with respect to the axis of symmetry 36. A diameter of the embossed structure 32b of the second metal sheet 100b is smaller than a diameter of the cutout 30a of the first metal sheet 100a. The circular embossed structure 32b is visible in full through the cutout 30a.

The cutout 30b of the second metal sheet 100b is delimited and bordered by a circular edge 33b, so that the cutout 30b forms a circular through-opening or a circular through-hole in the second metal sheet 100b. The embossed structure 32a of the first metal sheet 100a, which is visible through the cutout 30b, likewise has a circular shape. The embossed structure 32a of the first metal sheet 100a comprises an elevation which points in a direction facing away from the second metal sheet 100b. In certain embodiments, the embossed structure 32a comprises a ring-shaped flank 34a and a circular flat plateau 35a bordered by the ring-shaped flank 34a. The cutout 30b and the embossed structure 32a are arranged concentrically and symmetrically with respect to a common axis of symmetry 37, which is perpendicular to the parallel metal sheets 100a, 100b. In certain embodiments, the cutout 30b and the embossed structure 32a have a continuous rotational symmetry with respect to the axis of symmetry 37. A diameter of the embossed structure 32a of the first metal sheet 100a is smaller than a diameter of the cutout 30b of the second metal sheet 100b. The circular embossed structure 32a is visible in full through the cutout 30b.

In the separator plate arrangement 100 shown in FIGS. 4, 5A-C, a maximum diameter of the cutouts 30a, 30b is in each case smaller than a maximum diameter of the smallest of the through-openings 11a-c. By way of example, the maximum diameter of the cutouts 30a, 30b is in each case less than half or less than one-third of the maximum diameter of the smallest of the through-openings a-c. Furthermore, a smallest distance between the centre points or centroids 36, 37 of the cutout 30a and of the embossed structure 32a of the first metal sheet 100a is less than three times or less than 2.5 times the maximum diameter of the cutout 30a, and a smallest distance between the centre points or centroids 36, 37 of the cutout 30b and of the embossed structure 32b of the second metal sheet 100b is less than three times or less than 2.5 times the maximum diameter of the cutout 30b. In the embodiment shown in FIGS. 4 and 5A-C, the cutouts 30a, 30b and the embossed structures 32a, 32b are in each case identical and in each case have the same geometry and the same dimensions. In alternative embodiments, the cutouts 30a, 30b and the embossed structures 32a, 32b may in each case be different.

In the separator plate arrangement 100 shown in FIGS. 4, 5A-C, the cutout 30a and the embossed structure 32a on the one hand and the cutout 31a and the embossed structure 33a on the other hand are arranged in diagonally opposite corners of the substantially rectangular metal sheet 100a, and the cutout 30b and the embossed structure 32b on the one hand and the cutout 31b and the embossed structure 33b on the other hand are arranged in diagonally opposite corners of the substantially rectangular metal sheet 100b.

The cutout 31a of the first metal sheet 100a, the cutout 31b of the second metal sheet 100b, which in FIG. 4 is hidden by the first metal sheet 100a, and the embossed structures 33a, 33b of the metal sheets 100a, 100b may be designed and arranged in a manner entirely analogous to the above-described cutouts 30a, 30b and embossed structures 32a, 32b of the metal sheets 100a, 100b. For example, the cutout 30a and the embossed structure 32a may transition to the cutout 31a and to the embossed structure 33a, and vice versa, by rotation through 180 degrees about an axis of rotation which is perpendicular to the points of intersection of the surface diagonals of the metal sheet 100a. Likewise, the cutout 30b and the embossed structure 32b may transition to the cutout 31b and to the embossed structure 33b, and vice versa, by rotation through 180 degrees about an axis of rotation which is perpendicular to the points of intersection of the surface diagonals of the metal sheet 100b.

The distance between the cutouts 30a, 31a of the first metal sheet 100a is at least twice the width of the first metal sheet 100a determined in the surface plane of the first metal sheet 100a, that is to say in the x-y plane. Likewise, the distance between the embossed structures of the first metal sheet 100a is at least twice the width of the first metal sheet 100a determined in the surface plane of the first metal sheet 100a, that is to say in the x-y plane. Furthermore, the distance between the embossed structures 32a, 33a of the first metal sheet 100a is at least 90% of the length of the first metal sheet 100a determined in the surface plane of the first metal sheet 100a, that is to say in the x-y plane. The same applies to the distances between the cutouts 30b, 31b of the second metal sheet 100b and to the distances between the embossed structures 32b, 33b of the second metal sheet 100b.

The large distances, for example between the embossed structures 32a, 33a of the first metal sheet 100a and between the embossed structures 32b, 33b of the second metal sheet 100b, make it possible to detect in a particularly easy manner, from just one surface, namely the surface facing towards the viewer in FIG. 4, an incorrect positioning of the first metal sheet 100a relative to the second metal sheet 100b, for example prior to connecting the two metal sheets 100a, 100b to one another by welding.

FIGS. 6A-C schematically show a modification to the above-described detail of the separator plate arrangement 100 shown in FIGS. 4 and 5A-C. The modification shown in FIGS. 6A-C differs from the detail shown in FIGS. 4 and 5A-C only in that, in the modification shown in FIGS. 6A-C, the embossed structure 32b of the second metal sheet 100b has a shape similar to a triangle in plan view, with rounded corners and partially bulbous edges. In FIGS. 6A-C, the embossed structure 32b of the second metal sheet 100b is symmetrical with respect to a plane of symmetry 38 which is oriented perpendicular to the metal sheet 100b. In the modification shown in FIGS. 6A-C, therefore, the embossed structures 32a, 32b of the two metal sheets 100a, 100b are different.

FIG. 7 schematically shows two perspective views of a further modification to the above-described detail of the separator plate arrangement 100 shown in FIGS. 4 and 5A-C. The upper of the two views shown in FIG. 7 shows the detail along a viewing direction directed towards the first metal sheet 100a, in which the second metal sheet 100b is largely hidden by the first metal sheet 100a so that the embossed structure 32b of the second metal sheet 100b is visible only through the cutout 30a of the first metal sheet 100a. Conversely, the lower of the two views shown in FIG. 7 shows the detail along a viewing direction directed towards the second metal sheet 100b, in which the first metal sheet 100a is largely hidden by the second metal sheet 100b so that the embossed structure 32a of the first metal sheet 100a is visible only through the cutout 30b of the second metal sheet 100b.

The modification shown in FIG. 7 differs from the embodiments described above in that the embossed structure 32a of the first metal sheet 100a extends as far as the cutout 30a of the first metal sheet 100a, so that the embossed structure 32a comprises a deformation of the edge 33a of the first metal sheet 100a bordering the cutout 30a. Analogously, the embossed structure 32b of the second metal sheet 100b extends as far as the cutout 30b of the second metal sheet 100b, so that the embossed structure 32b comprises a deformation of the edge 33b of the second metal sheet 100b bordering the cutout 30b. Furthermore, the embossed structures 32a, 32b shown in FIG. 7 in each case do not have flattened shape, but rather a bump-like or dome-like shape, wherein the bumps or the domes are each partially cut off at the edge 33a, 33b bordering the cutout 30a, 30b.

The embossed structure 32a of the first metal sheet 100a is visible in full through the cutout 30b of the second metal sheet 100b, and the embossed structure 32b of the second metal sheet 100b is visible in full through the cutout 30a of the first metal sheet 100a. In addition, the cutouts 30a, 30b of the metal sheets 100a, 100b are designed and arranged such that a perpendicular projection of the cutout 30a of the first metal sheet 100a, in the sense described above, onto a plane defined by the first metal sheet 100a or by the second metal sheet 100b and a perpendicular projection of the cutout 30b of the second metal sheet 100b onto said plane overlap one another at least in part. Here, said plane is for example once again oriented parallel to non-embossed flat regions 22a, 22b of the metal sheets 100a, 100b and thus parallel to the x-y plane. Consequently, a portion of the edge 33b bordering the cutout 30b of the second metal sheet 100b is visible through the cutout 30a of the first metal sheet 100a, and a portion of the edge 33a bordering the cutout 30a of the first metal sheet 100a is visible through the cutout 30b of the second metal sheet 100b.

FIG. 8A schematically shows two perspective views of a further modification to the above-described detail of the separator plate arrangement 100 shown in FIGS. 4 and 5A-C. Here, the upper of the two views shown in FIG. 8A shows the detail along a viewing direction corresponding to the viewing direction in the lower view of FIG. 7, and the lower of the two views shown in FIG. 8A shows the detail along a viewing direction corresponding to the viewing direction in the upper view of FIG. 7.

The modification shown in FIG. 8A differs from the detail shown in FIGS. 4 and 5A-C in that the embossed structure 32a of the first metal sheet 100a has an elevation which points in a direction facing towards the second metal sheet 100b, and in that the embossed structure 32b of the second metal sheet 100b has an elevation which points in a direction facing towards the first metal sheet 100b. The embossed structure 32a of the first metal sheet 100a protrudes through the cutout 30b of the second metal sheet 100b. In certain embodiments, the embossed structure 32a of the first metal sheet 100a protrudes beyond a surface of the second metal sheet 100b facing away from the first metal sheet 100a or beyond the edge 33b bordering the cutout 30b of the second metal sheet 100b. Likewise, the embossed structure 32b of the second metal sheet 100b protrudes through the cutout 30a of the first metal sheet 100a. In certain embodiments, the embossed structure 32b of the second metal sheet 100b protrudes beyond a surface of the first metal sheet 100a facing away from the second metal sheet 100b or beyond the edge 33a bordering the cutout 30a of the first metal sheet 100a.

FIG. 8B schematically shows two perspective views of a further modification to the above-described detail of the separator plate arrangement 100 shown in FIGS. 4 and 5A-C. Here, the upper of the two views shown in FIG. 8B shows the detail along a viewing direction corresponding to the viewing direction in the upper view of FIG. 8A, and the lower of the two views shown in FIG. 8B shows the detail along a viewing direction corresponding to the viewing direction in the lower view of FIG. 8A.

The modification shown in FIG. 8B differs from that shown in FIG. 8A in that the cutouts 30a, 30b of the metal sheets 100a, 100b in the modification shown in FIG. 8B each extend to an outer edge 25a, 25b of the respective metal sheet 100a, 100b, so that the cutouts 30a, 30b are not designed as through-openings, as in the previous embodiments, but rather as indentations in the outer edge 25a, 25b. In FIG. 8B, the cutouts 30a, 30b each have the shape of a semicircle, and the embossed structures 32a, 32b each extend to the outer edge 25a, 25b of the respective metal sheet 100a, 100b and have the shape of a half-bump or a half-dome. The cutouts 30a, 30b and the embossed structures 32a, 32b are thus each arranged symmetrically with respect to two possible planes of symmetry which are perpendicular to the metal sheets 100a, 100b, that is to say in FIG. 8B perpendicular to the x-y plane. One of these planes of symmetry is oriented parallel to the x-z plane, and the other of these planes of symmetry is oriented parallel to the y-z plane.

FIG. 8C shows the modifications according to FIGS. 8A, 8B in a sectional view, wherein the sectional plane is oriented parallel to the y-z plane and in FIGS. 8A, 8B is in each case represented by the sectional straight line 26. FIG. 8C clearly shows the engaging (protruding) of the embossed structure 32a of the first metal sheet 100a through the cutout 30b of the second metal sheet 100b and the engaging (protruding) of the embossed structure 32b of the second metal sheet 100b through the cutout 30a of the first metal sheet 100a.

FIG. 9 schematically shows two perspective views of a further modification to the above-described detail of the separator plate arrangement 100 shown in FIGS. 4 and 5A-C. Here, the upper of the two views shown in FIG. 9 shows the detail along a viewing direction corresponding to the viewing direction in the upper view of FIG. 8B, and the lower of the two views shown in FIG. 9 shows the detail along a viewing direction corresponding to the viewing direction in the lower view of FIG. 8B.

The modification shown in FIG. 9 differs from that shown in FIG. 8B in that the embossed structures 32a, 32b are each at a distance from the outer edge 25a, 25b of the respective metal sheet 100a, 100b and each have a circular shape. The embossed structures 32a, 32b of the modification shown in FIG. 9 thus each have a continuous rotational symmetry with respect to an axis of symmetry which is perpendicular to the metal sheets 100a, 100b. In FIG. 9, these axes of symmetry are thus each oriented parallel to the z-axis 7.

FIG. 10 schematically shows two perspective views of a further modification to the above-described detail of the separator plate arrangement 100 shown in FIGS. 4 and 5A-C. Here, the upper of the two views shown in FIG. 10 shows the detail along a viewing direction corresponding to the viewing direction in the upper view of FIG. 9, and the lower of the two views shown in FIG. 10 shows the detail along a viewing direction corresponding to the viewing direction in the lower view of FIG. 9.

The modification shown in FIG. 10 differs from that shown in FIG. 9 in that the outer edge 25a of the first metal sheet 100a has an embossing in the form of an elevation which points in a direction facing away from the second metal sheet 100b and which comprises the embossed structure 32a and also an embossed structure 39a extending around the cutout 30a and containing the edge 33a of the cutout 30a. Correspondingly, the outer edge 25b of the second metal sheet 100b has an embossing in the form of an elevation which points in a direction facing away from the first metal sheet 100a and which comprises the embossed structure 32b and also an embossed structure 39b extending around the cutout 30b and containing the edge 33b of the cutout 30b.

As in the modifications shown in FIGS. 8B and 9, the cutouts 30a, 30b are designed as indentations in the outer edge 25a, 25b of the respective metal sheet 100a, 100b. Both the embossed structure 32b of the second metal sheet 100b and part of the non-embossed flat region 22b of the second metal sheet 100b are visible through the cutout 30a of the first metal sheet 100a, so that the boundaries of the embossed structure 32b can be detected, or can be detected at least in part, through the cutout 30a. Correspondingly, both the embossed structure 32a of the first metal sheet 100a and part of the non-embossed flat region 22a of the first metal sheet 100a are visible through the cutout 30b of the second metal sheet 100b, so that the boundaries of the embossed structure 32a can be detected, or can be detected at least in part, through the cutout 30b. The embossed structures 32a, 32b are each designed such that they extend mirror-symmetrically with respect to a mirror plane extending perpendicular to the outer edge 25a or 25b. In addition, they have a point at which they are each at the greatest distance from the outer edge 25a or 25b or from an imaginary line that continues the respective outer edge across the cutout.

FIG. 11 schematically shows two perspective views of a further modification to the above-described detail of the separator plate arrangement 100 shown in FIGS. 4 and 5A-C. Here, the upper of the two views shown in FIG. 11 shows the detail along a viewing direction corresponding to the viewing direction in the upper view of FIG. 10, and the lower of the two views shown in FIG. 11 shows the detail along a viewing direction corresponding to the viewing direction in the lower view of FIG. 10.

The modification shown in FIG. 11 differs from that shown in FIG. 10 in that the cutouts 30a, 30b are designed as through-openings of the respective metal sheet 100a, 100b and are at a distance from the outer edge 25a, 25b of the respective metal sheet 100a, 100b. As in the modification shown in FIG. 10, the outer edge 25a, 25b of the metal sheets 100a, 100b once again has an embossing. Unlike in the modification shown in FIG. 10, however, this embossing does not extend in each case as far as the edge 33a, 33b bordering the cutout 30a, 30b. As in the modification shown in FIG. 10, the embossed structure 32b and part of the non-embossed region 22b of the second metal sheet 100b are visible through the cutout 30a of the first metal sheet 100a, and the embossed structure 32a and part of the non-embossed region 22a of the first metal sheet 100a are visible through the cutout 30b of the second metal sheet 100b. With regard to the symmetry or the definition of a reference point, the embossed structures 32a, 32b of FIG. 11 are comparable to FIG. 10.

FIG. 12 schematically shows, in plan view, a further modification to the above-described detail of the separator plate arrangement 100 shown in FIGS. 4 and 5A-C. Here, the viewing direction points in the negative z-direction 7 and is directed primarily towards the first metal sheet 100a, which largely hides the second metal sheet 100b arranged therebelow in the viewing direction. The first metal sheet 100a has a cutout 30a in the form of a substantially rectangular, elongated through-opening, as well as ring-shaped embossed structures 32a of identical size which are arranged on each side of the elongated cutout 30a. Likewise, the second metal sheet 100b has a cutout 30b in the form of a substantially rectangular, elongated through-opening, as well as ring-shaped embossed structures 32b of identical size which are arranged on each side of the elongated cutout 30b. Thus, there is a plurality of embossed structures, in the current example two, arranged both around the first and the second cutout 30a, 30b, respectively. The cutouts 30a, 30b are designed and arranged such that perpendicular projections of the cutouts 30a, 30b onto a plane parallel to the metal sheets 100a, 100b and parallel to the x-y plane overlap one another. Here, the perpendicular projections of the cutouts 30a, 30b onto the x-y plane jointly form a cross with rotational symmetry of order 4 with respect to an axis of symmetry parallel to the z-direction 7. Projections of the embossed structures 32a, 32b onto the x-y plane are each arranged in the region of the ends of the arms of the cross thus formed. The dashed lines 38a, 38b indicate the planes of symmetry of the mirror symmetry of the embossed structures 32a and 32b.

The embossed structures 32a of the first metal sheet 100a are designed and arranged such that, when viewed in the positive z-direction 7, they are visible through the cutout 30b of the second metal sheet 100b, and the embossed structures 32b of the second metal sheet 100b are designed and arranged such that, when viewed in the negative z-direction 7, they are visible through the cutout 30a of the first metal sheet 100a. In order to illustrate the arrangements of the cutouts 30a, 30b and of the embossed structures 32a, 32b, the regions of the metal sheets 100a, 100b which are visible through in each case one of the cutouts are hatched differently in FIG. 12. For instance, in FIG. 12, the region of the second metal sheet 100b in which the embossed structures 32b are arranged, which is visible through the cutout 30a, is hatched from bottom left to top right and the region of the first metal sheet 100a in which the embossed structures 32a are arranged, which is visible through the cutout 30b, is hatched from top left to bottom right. The flat region 22a of the first metal sheet 100a, surrounding the cutout 30a, is hatched crosswise, thereby illustrating the overlapping of the two metal sheets 100a, 100b in this region. The region in which the projections of the cutouts 30a, 30b onto the x-y plane overlap is not hatched. The separator plate arrangement 100 has a through-opening in this region.

Figure 13:
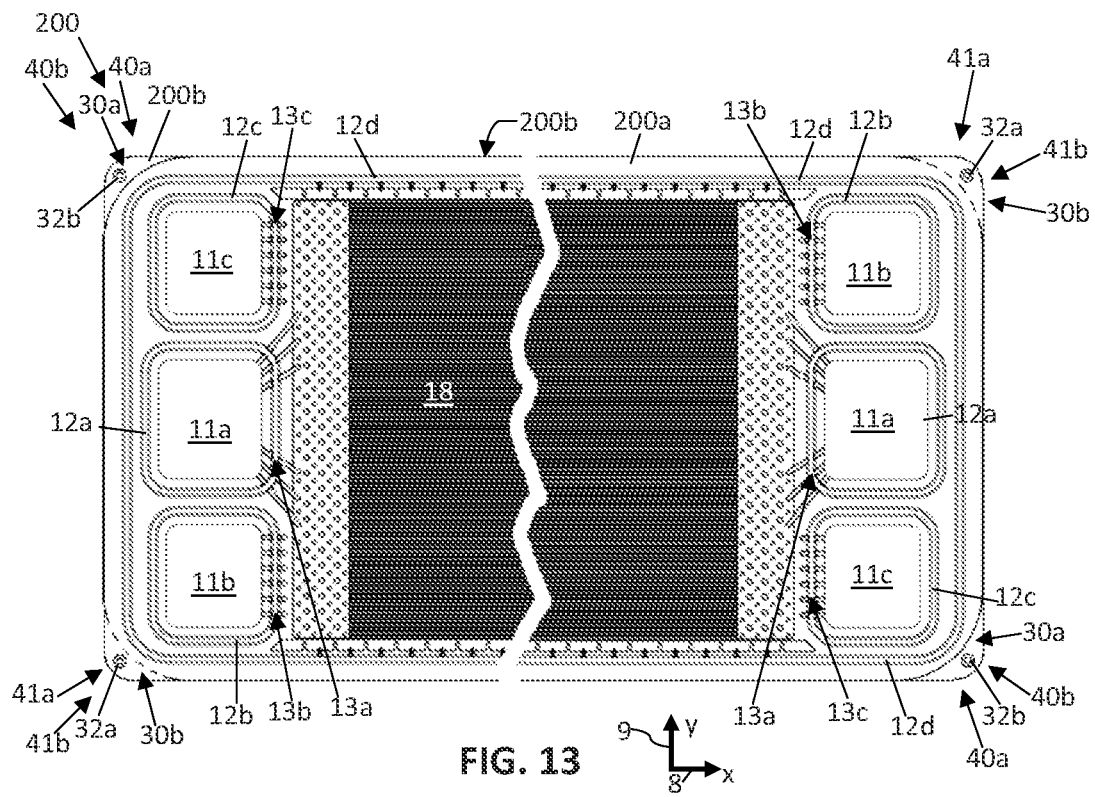
FIG. 13 schematically shows a plan view of a separator plate arrangement of the type proposed here, according to a further embodiment.

FIG. 13 shows a plan view of a separator plate arrangement 200, which is a variant of the separator plate arrangement 100 shown in FIG. 4. The separator plate arrangement 200 can thus in each case replace the separator plates 2 in the system 1 shown in FIG. 1. The arrangement 200 comprises two substantially rectangular metal sheets 200a, 200b of identical or substantially identical size, which are connected to one another. The first metal sheet 200a, facing towards the viewer, comprises inter alia through-openings 11a-c, an electrochemically active region 18 and sealing arrangements 12a-d. The sealing arrangement 12d entirely surrounds the active region 18 and all the through-openings 11a-c and serves in particular for sealing off the active region 18 with respect to the surrounding environment and with respect to the other regions of the system 1 (see FIG. 1). The second metal sheet 200b, which faces away from the viewer and is almost entirely hidden by the metal sheet 200a, has corresponding through-openings, a corresponding electrochemically active region and corresponding sealing arrangements (hidden here).

The second metal sheet 200b has ring-shaped embossed structures 32b in diagonally opposite corner regions 40b. And the first metal sheet 200a has cutouts 30a in the form of notches, more precisely strongly rounded corners, in corresponding diagonally opposite corner regions 40a of the first metal sheet 200a. The cutouts 30a in the corner regions 40a of the first metal sheet 200a and the embossed structures 32b in the corner regions 40b of the second metal sheet 200b are arranged and designed such that the embossed structures 32b of the second metal sheet 200b, when viewed along the negative z-direction 7, are visible through the cutouts 30a of the first metal sheet 100a in the cut-away corner regions 40a of the first metal sheet 100a.

Conversely, the first metal sheet 200a has ring-shaped embossed structures 32a in the two other diagonally opposite corner regions 41a. And the second metal sheet 200b has cutouts 30b in the form of notches, which are indicated by dashed lines in FIG. 13, in corresponding diagonally opposite corner regions 41b of the second metal sheet 200b. The cutouts 30b in the corner regions 41b of the second metal sheet 200b and the embossed structures 32a in the corner regions 41a of the first metal sheet 200a are arranged and designed such that the embossed structures 32a of the first metal sheet 200a, when viewed along the positive z-direction 7, are visible through the cutouts 30b of the second metal sheet 100b in the cut-away corner regions 41b of the second metal sheet 100b.

The cutouts 30a, 30b and the embossed structures 32a, 32b are each arranged outside of the sealing arrangement extending around the active region of the respective metal sheet.

The cut-away or set-back corners 30a of the first metal sheet make it possible to locate the two embossed structures 32b of the second metal sheet through the cutouts of the first metal sheet. The two embossed structures 32b lie in a common plane. These two embossed structures 32b thus make it possible to fully determine the position of the first metal sheet. Since the embossed structures 32b have been integrally formed in the second metal sheet in the same forming step as the sealing beads and/or the webs of the active region, the position of the sealing beads and/or of the webs of the active region of the relevant metal sheet can be determined through the first metal sheet on the basis of the position of the two embossed structures 32b. This makes it possible, for example by means of position sensors which are arranged on the side of the first metal sheet facing away from the second metal sheet, to determine through the cutouts 30a the positions of regions to be coated and to perform a partial coating without interference by position sensors standing in the way on the side of the second metal sheet facing away from the first metal sheet.

Figure 14:
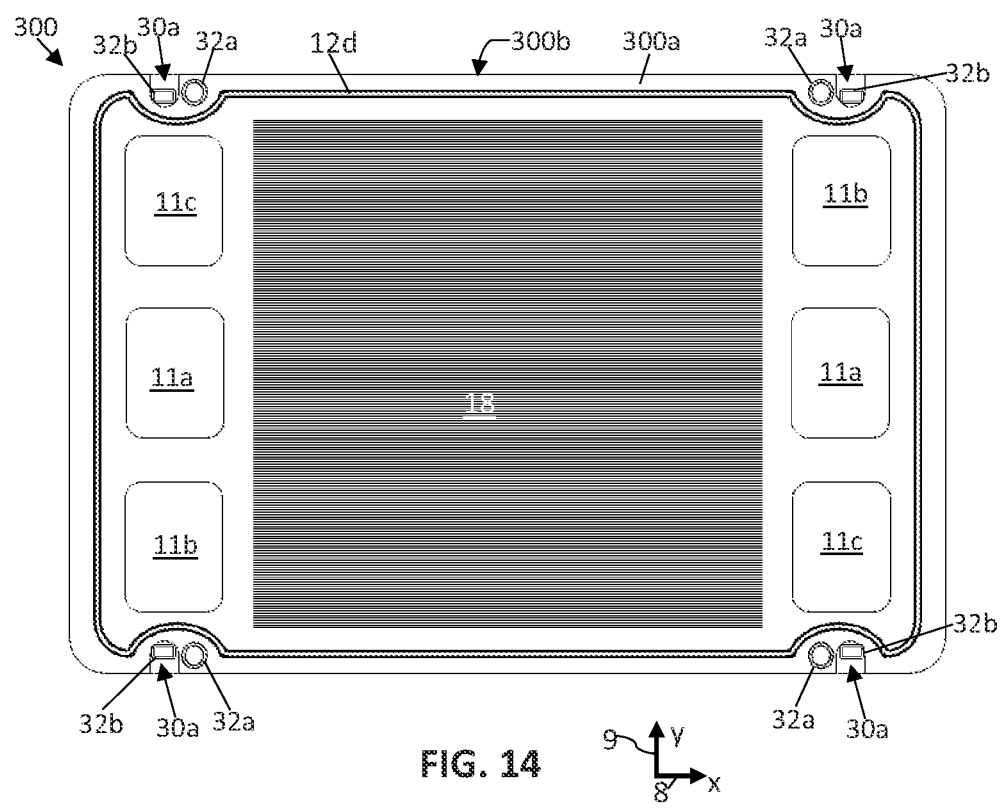
FIG. 14 schematically shows a plan view of a separator plate arrangement of the type proposed here, according to a further embodiment.

FIG. 14 shows a plan view of a separator plate arrangement 300, which is a further variant of the separator plate assemblies 100, 200 shown in FIGS. 4 and 13. The separator plate arrangement 300 can thus in each case replace the separator plates 2 in the system 1 shown in FIG. 1. The separator plate arrangement 300 once again comprises a first metal sheet 300a and a second metal sheet 300b, wherein the second metal sheet 300b is largely hidden by the first metal sheet 300a facing towards the viewer. The first metal sheet 300a has inter alia an electrochemically active region 18 and a sealing arrangement 12d extending all the way around the active region 18, which serves to seal the latter. To simplify the drawing, some details, such as the distribution region or the beads sealing off the through-opening, have been omitted here and also in FIGS. 15A and 15B. Outside of the sealing arrangement 12d extending around the active region 18, the first metal sheet 300a has four cutouts 30a, each designed as an indentation in the outer edge, and an embossed structure 32a adjacent to each of said cutouts. While the embossed structures 32a are each circular, the cutouts 30a are rectangular with a strongly rounded inner end; they could also be referred to as half-slots. Outside of a sealing arrangement which corresponds to the sealing arrangement 12d and which for its part encloses and seals off an electrochemically active region of the second metal sheet 300b, the second metal sheet 300b has the same number of corresponding cutouts 30b (hidden) and embossed structures 32b, wherein each of the four embossed structures 32b of the largely hidden second metal sheet 300b is visible through one of the four cutouts 30a of the first metal sheet 300a at least to such an extent that the centroid thereof can be clearly determined. The position of these centroids of the embossed structures 32b makes it possible to determine clearly, through the cutouts 30a, the position of all the embossed structures of the second metal sheet 300b that have been formed with the embossed structures 32b in a deformation step. Correspondingly, each of the four embossed structures 32a of the first metal sheet 300a is visible (not shown) at least in part through one of the four cutouts 30b of the first metal sheet 300b.

Figure 15A:
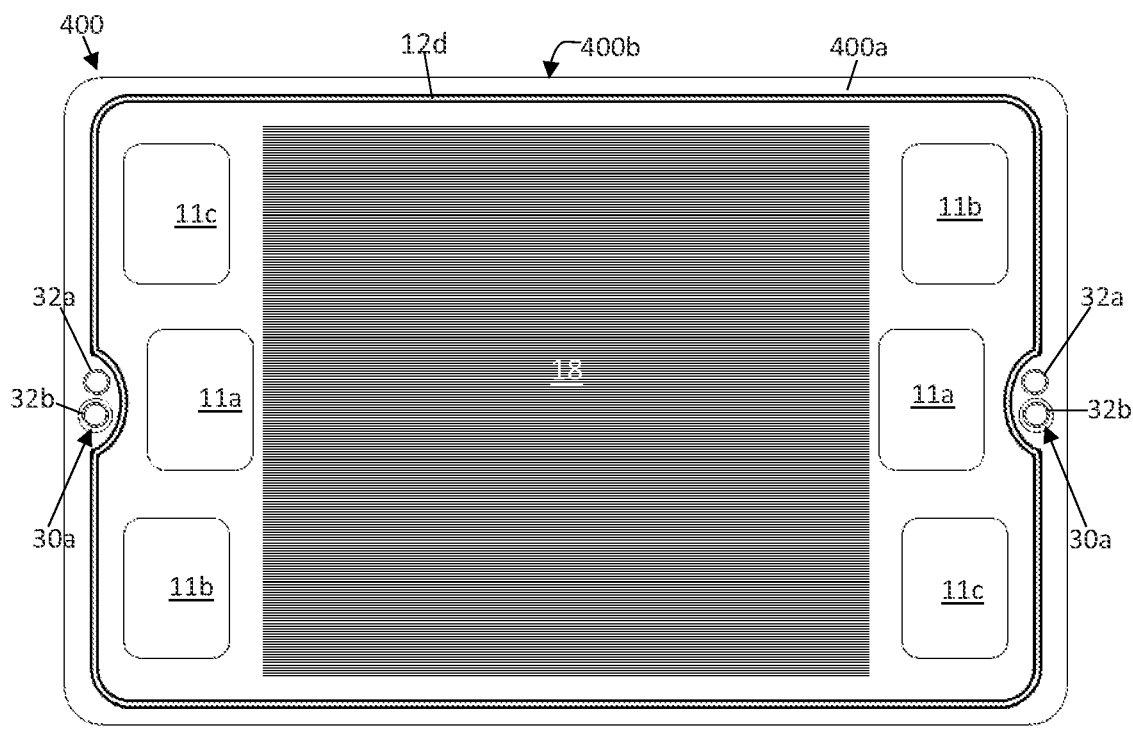
FIG. 15A schematically shows a plan view of a separator plate arrangement of the type proposed here, according to a further embodiment, wherein the relative alignment of two metal sheets of the separator plate arrangement meets a tolerance specification.
Figure 15B:
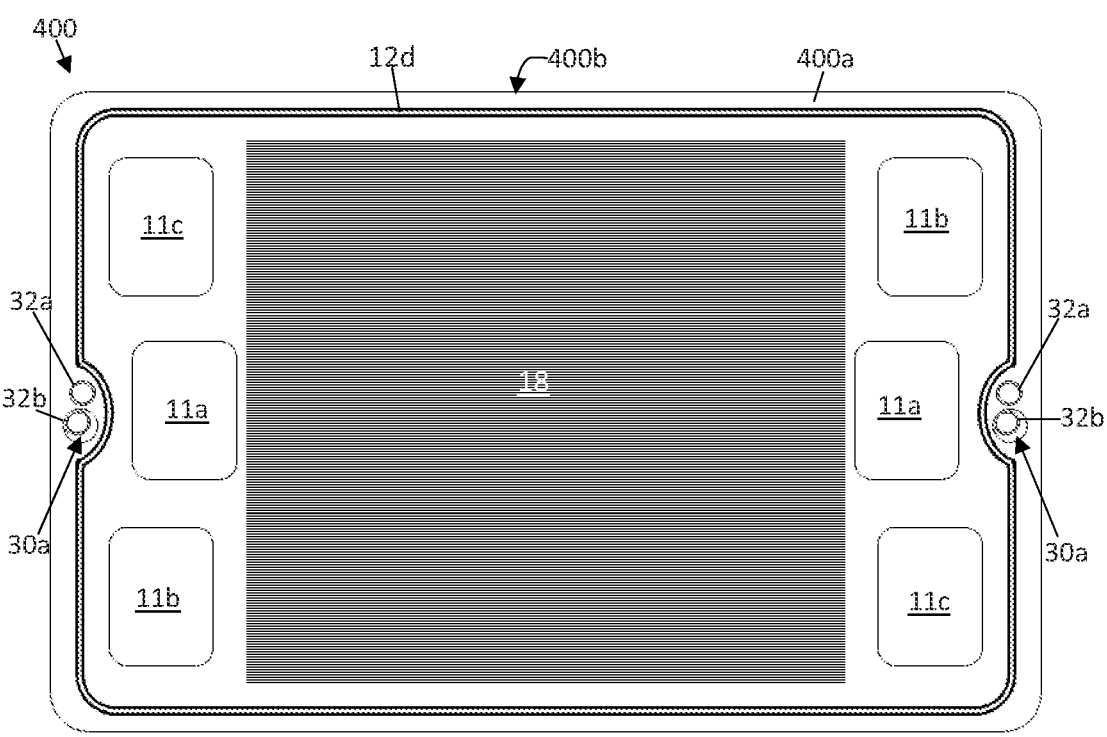
FIG. 15B schematically shows a plan view of the separator plate arrangement of FIG. 15A, wherein the relative alignment of the metal sheets does not meet the tolerance specification.

FIGS. 15A, 15B each show a plan view of a separator plate arrangement 400, which is a further variant of the separator plate assemblies 100, 200, 300 shown in FIGS. 4, 13 and 14. The separator plate arrangement 400 can thus in each case replace the separator plates 2 in the system 1 shown in FIG. 1.

The separator plate arrangement 400 comprises two metal sheets 400a, 400b, wherein the second metal sheet 400b is largely hidden by the first metal sheet 400a facing towards the viewer. The first metal sheet 400a once again has inter alia an electrochemically active region 18 and a sealing arrangement 12d extending all the way around the active region 18, which serves to seal off the latter. Outside of the sealing arrangement 12d extending around the active region 18, the first metal sheet 400a has, on opposite end faces, a respective cutout 30a, designed as a through-opening, and an embossed structure 32a adjacent to each of said cutouts. Outside of a sealing arrangement which corresponds to the sealing arrangement 12d and which for its part encloses and seals off an electrochemically active region of the second metal sheet 400b, the second metal sheet 400b likewise has two corresponding cutouts 30b (hidden) and embossed structures 32b, wherein each of the two embossed structures 32b of the largely hidden second metal sheet 400b is visible through one of the two cutouts 30a of the first metal sheet 400a. Correspondingly, each of the two embossed structures 32a of the first metal sheet 400a is visible (not shown) through one of the two cutouts 30b of the first metal sheet 400b.

By virtue of an image capturing unit, for example a camera, which points in the negative z-direction 7, at least one image of the arrangement 400 can be created showing the embossed structures 32a of the first metal sheet 400a and the second embossed structures 32b of the second metal sheet 400b. Based on this image or these images, a centroid of a projection of each of the two embossed structures 32a and of each of the two embossed structures 32b onto the x-y plane can be determined. This may be carried out for example using image recognition methods known per se. Thereafter, a distance between the centroid of each of the two embossed structures 32a of the first metal sheet 400a and the centroid of the respective nearest of the two embossed structures 32b of the second metal sheet 400b can be determined or ascertained. Therefore, based on at least one image of the arrangement 400, two distance values can be determined or ascertained, which are each a measure of the relative position of one of the pairs of embossed structures 32a, 32b, wherein each of these pairs comprises one of the embossed structures 32a of the first metal sheet 400a and one of the embossed structures 32b of the second metal sheet 400b. Each of these distance values can then be compared with a specified distance value. The deviation of the thus determined or ascertained distance values from the specified distance value is then a measure of the quality of the relative alignment of the metal sheets 400a, 400b of the arrangement 400 with respect to one another.

If the determined or ascertained distances are each less than or equal to a specified maximum tolerance value or maximum tolerance distance, the quality of the relative alignment of the metal sheets 400a, 400b with respect to one another meets the specified requirements. This situation is shown in FIG. 15A. In said figure, the embossed structures 32b of the second metal sheet 400b are each arranged concentrically to the cutouts 30a of the first metal sheet 400a, through which they are visible. The metal sheets 400a, 400b can then be connected, for example in a joining tool, or the arrangement 400 can be further processed in a further operating step. This may for example comprise the coating or printing of at least one of the metal sheets 400a, 400b of the arrangement 400, in particular the coating or printing of at least one of the metal sheets 400a, 400b in the connected state of the two metal sheets.

If, on the other hand, the determined or ascertained distances are each greater than the maximum tolerance value or the maximum tolerance distance, the quality of the relative alignment of the metal sheets 400a, 400b with respect to one another does not meet the specified requirements. This situation is shown in FIG. 15B. In said figure, the embossed structures 32b of the second metal sheet 400b are each not arranged concentrically to the cutouts 30a of the first metal sheet 400a, through which they are visible, but rather are clearly shifted with respect thereto. This may for example trigger a warning signal, initiate a discarding of the arrangement 400, or give rise to a readjustment of the relative alignment of the metal sheets 400a, 400b with respect to one another. The readjustment may be carried out until the determined or ascertained distances are each less than or equal to the maximum tolerance value or the maximum tolerance distance.

As an alternative to the substantially rectangular plate assemblies shown in FIGS. 13 to 15B, other basic shapes can also be used, for example with regions projecting laterally, that is to say in the width direction, in particular in the region of the through-openings 11a to 11c. In this case, the width of the separator plate may also be defined as the width obtained in the active region across the entire width of the metal layer.

Figure 16B:
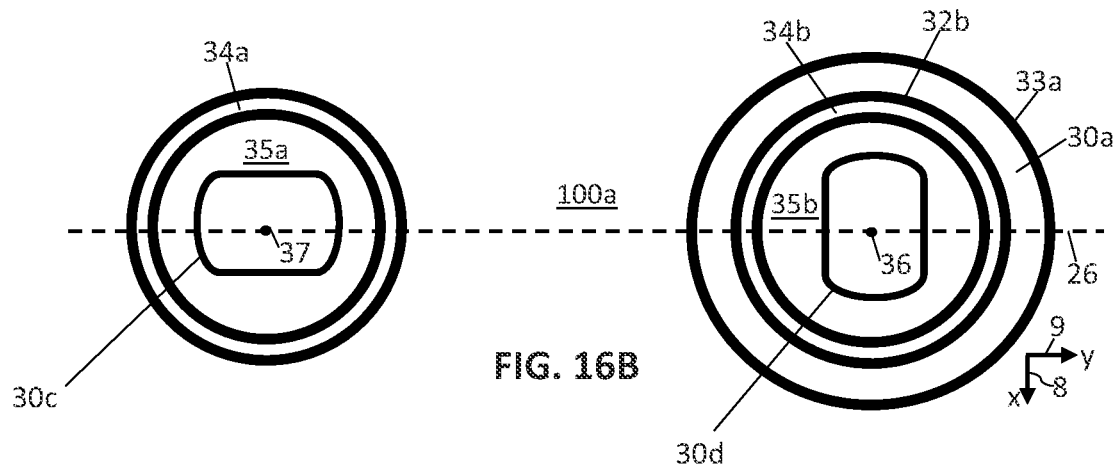
FIG. 16B schematically shows the detail according to FIG. 16A in a first plan view.
Figure 16A:
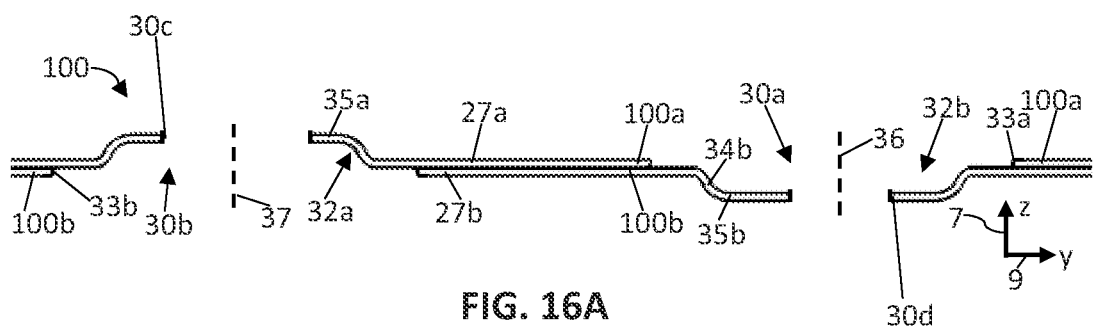
FIG. 16A schematically shows a section through a detail of the separator plate arrangement of FIG. 4 according to a further modification.
Figure 16C:
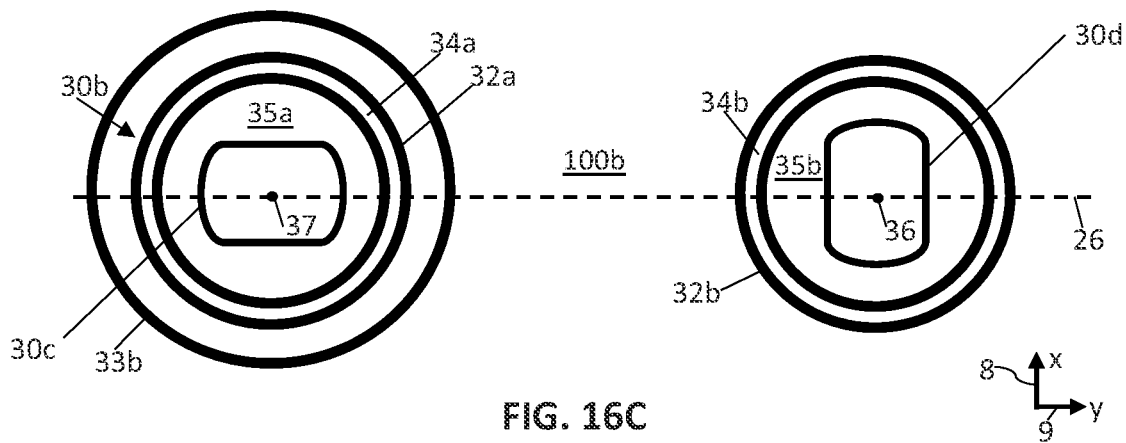
FIG. 16C schematically shows the detail according to FIG. 16A in a second plan view.

A further embodiment of a plate arrangement 100 is shown in FIGS. 16A to 16C, which substantially corresponds to the embodiment of FIGS. 5A to 5C. There is therefore no need to repeat the description of identical features here. The only difference of the separator plate arrangement 100 of FIGS. 16A-16C from the separator plate arrangement 100 of FIGS. 5A-5C is that additionally a third cutout 30c is provided in the region defined by the perpendicular projection of the second cutout 30b onto the first metal sheet 100a. Furthermore, additionally a fourth cutout 30d is provided additionally in the region defined by the perpendicular projection of the first cutout 30a onto the second metal sheet 100b.

As indicated in FIGS. 16A-16C, the third cutout 30c may be formed inside of the first embossed structure 32a, wherein the first embossed structure 32a entirely surrounds the third cutout 30c. Usually, the third cutout 30c and a centroid and/or centre point of the first embossed structure 32a overlap. The third cutout 30c and the first embossed structure 32a may be arranged concentrically and symmetrically with respect to a common axis of symmetry 37.

The same can apply to the fourth cutout 30d. The fourth cutout 30d may thus be formed inside of the second embossed structure 32b, wherein the second embossed structure 32b entirely surrounds the fourth cutout 30d. Usually, the fourth cutout 30d and a centroid and/or centre point of the second embossed structure 32b overlap. The fourth cutout 30d and the second embossed structure 32b may be arranged concentrically and symmetrically with respect to a common axis of symmetry 36.

The third cutout 30c and/or the fourth cutout 30d are usually each designed as a through-opening in the respective metal sheet 100a, 100b. Alternatively, the cutouts 30c, 30d may be designed as an indentation, for example an indentation in the outer edge, for example as in the arrangement of FIG. 8B. In the exemplary embodiment shown, the third cutout 30c and the fourth cutout 30d are each designed as a slot (elongated hole) and thus differ in terms of their geometric shape from the circular embossed structures 32a, 32b. However, other geometric shapes are also conceivable and are encompassed by the invention.

In FIGS. 16A-16C, the third cutout 30c and the fourth cutout 30d are identical in terms of their shape, size and position inside of the respective embossed structure 32a, 32b or are identical within their manufacturing tolerances. However, the cutouts 30c, 30d may also differ from one another in at least one of these aspects. Furthermore, a longitudinal direction defined by the third cutout 30c is arranged at an angle, in the example shown perpendicularly, to a longitudinal direction defined by the fourth cutout 30d. Other orientations of the cutouts 30c, 30d relative to one another are also possible.

A surface area of the embossed structure 32a of the first metal sheet 100a is larger than a surface area of the third cutout 30c. A cut edge of the third cutout 30c is visible in full through the second cutout 30b. A center point (or centroid) of the embossed structure 32a and a center point (or centroid) of the second cutout 30b can be determined through the third cutout 30c from both sides of the separator plate arrangement 100.

Similarly, a surface area of the embossed structure 32b of the second metal sheet 100b is larger than a surface area of the fourth cutout 30d. The cut edge of the fourth cutout 30d is visible in full through the cutout 30a. A center point (or centroid) of the embossed structure 32b and a center point (or centroid) of the second cutout 30a can be determined through the fourth cutout 30d from both sides of the separator plate arrangement 100.

Although the cutouts 30c, 30d are shown only in FIGS. 16A-16C, it is clear that the third cutout 30c and/or the fourth cutout 30d may also be provided in the embodiments of the other FIGS. 6-15B and may be claimed in combination with individual features of FIGS. 6-15B.

FIGS. 1-16C show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A separator plate arrangement for an electrochemical system, the separator plate comprising:
    a first metal sheet and a second metal sheet which touch one another at least in part along the mutually facing flat sides thereof,
    wherein the first metal sheet has a first circumferential sealing structure for sealing off an electrochemically active region, a first cutout arranged outside of the first circumferential sealing structure, and a first embossed structure arranged outside of the first circumferential sealing structure,
    wherein the second metal sheet has a second circumferential sealing structure for sealing off an electrochemically active region, a second cutout arranged outside of the second circumferential sealing structure, and a second embossed structure arranged outside of the second circumferential sealing structure,
    wherein the second embossed structure is arranged at least in part in a region of the second metal sheet that is defined by a perpendicular projection of the first cutout onto the second metal sheet, so that the second embossed structure is visible through the first cutout, and
    wherein the first embossed structure is arranged at least in part in a region of the first metal sheet that is defined by a perpendicular projection of the second cutout onto the first metal sheet, so that the first embossed structure is visible through the second cutout.

2. The separator plate arrangement according to claim 1, wherein the first cutout comprises a through-opening in the first metal sheet, and/or wherein the second cutout comprises a through-opening in the second metal sheet.

3. The separator plate arrangement according to claim 1, wherein the first cutout extends to an outer edge of the first metal sheet, so that the outer edge of the first metal sheet delimits the first cutout at least in part, and/or wherein the second cutout extends to an outer edge of the second metal sheet, so that the outer edge of the second metal sheet delimits the second cutout at least in part.

4. The separator plate arrangement according to claim 1, wherein the first embossed structure extends to the outer edge of the first metal sheet, and/or wherein the second embossed structure extends to the outer edge of the second metal sheet.

5. The separator plate arrangement according to claim 1, wherein, in the region of the second metal sheet defined by the perpendicular projection of the first cutout onto the second metal sheet, the second metal sheet has a fourth cutout in the form of a through-opening of the second metal sheet, besides the second embossed structure, and/or wherein, in the region of the first metal sheet defined by the perpendicular projection of the second cutout onto the first metal sheet, the first metal sheet has a third cutout in the form of a through-opening of the first metal sheet, besides the first embossed structure.

6. The separator plate arrangement according to claim 5, wherein the third cutout is formed at least partially or entirely inside of the first embossed structure, and/or wherein the fourth cutout is formed at least partially or entirely inside of the second embossed structure.

7. The separator plate arrangement according to claim 5, wherein the third cutout and a centroid and/or center point of the first embossed structure overlap, and/or wherein the fourth cutout and a centroid and/or center point of the second embossed structure overlap.

8. The separator plate arrangement according to claim 7, wherein the third cutout and the first embossed structure are arranged concentrically, and/or wherein the fourth cutout and the second embossed structure are arranged concentrically.

9. The separator plate arrangement according to claim 1, wherein a perpendicular projection of the first cutout onto a plane defined by the first metal sheet or by the second metal sheet and a perpendicular projection of the second cutout onto said plane overlap one another at least in part.

10. The separator plate arrangement according to claim 1, wherein the first embossed structure has a symmetry with respect to a first plane of symmetry or with respect to a first axis of symmetry, wherein the first plane of symmetry or the first axis of symmetry is oriented perpendicular to a first sheet plane defined by the first metal sheet, and/or wherein the second embossed structure has a symmetry with respect to a second plane of symmetry or with respect to a second axis of symmetry, wherein the second plane of symmetry or the second axis of symmetry is oriented perpendicular to a second sheet plane defined by the second metal sheet.

11. The separator plate arrangement according to claim 10, wherein the first embossed structure has an integer or continuous rotational symmetry with respect to the first axis of symmetry, and/or wherein the second embossed structure has an integer or continuous rotational symmetry with respect to the second axis of symmetry.

12. The separator plate arrangement according to claim 1, wherein the first metal sheet has one embossed structure extending around the first cutout or a plurality of embossed structures arranged around the first cutout, and/or wherein the second metal sheet has one embossed structure extending around the second cutout or a plurality of embossed structures arranged around the second cutout.

13. The separator plate arrangement according to claim 1, wherein the first metal sheet has a further cutout arranged outside of the first circumferential sealing structure and a further embossed structure arranged outside of the first circumferential sealing structure, wherein the second metal sheet has a further cutout arranged outside of the second circumferential sealing structure and a further embossed structure arranged outside of the second circumferential sealing structure, wherein the further embossed structure of the second metal sheet is arranged at least in part in a region of the second metal sheet that is defined by a perpendicular projection of the further cutout of the first metal sheet onto the second metal sheet, so that the further embossed structure of the second metal sheet is visible through the further cutout of the first metal sheet, and wherein the further embossed structure of the first metal sheet is arranged at least in part in a region of the first metal sheet that is defined by a perpendicular projection of the further cutout of the second metal sheet onto the first metal sheet, so that the further embossed structure of the first metal sheet is visible through the further cutout of the second metal sheet.

14. The separator plate arrangement according to claim 13, wherein the first metal sheet and the second metal sheet each have a rectangular or substantially rectangular shape with a length and a width, wherein the width is in each case smaller than or equal to the length, wherein a smallest distance of the first embossed structure from the further embossed structure of the first metal sheet is at least 80 percent of the width of the first metal sheet, and/or wherein a smallest distance of the second embossed structure from the further embossed structure of the second metal sheet is at least 80 percent of the width of the second metal sheet.

15. The separator plate arrangement according to claim 13, wherein the first metal sheet and the second metal sheet each have a rectangular or substantially rectangular shape with a length and a width, wherein the width is in each case smaller than or equal to the length, wherein a smallest distance of the first embossed structure from the further embossed structure of the first metal sheet is at least 80 percent of the length of the first metal sheet, and/or wherein a smallest distance of the second embossed structure from the further embossed structure of the second metal sheet is at least 80 percent of the length of the second metal sheet.

16. The separator plate arrangement according to claim 13, wherein a centroid of the first embossed structure in a plane defined by the first or by the second metal sheet is defined by a perpendicular projection of the first embossed structure onto said plane, wherein a centroid of the second embossed structure in said plane is defined by a perpendicular projection of the second embossed structure onto said plane, wherein a centroid of the further embossed structure of the first metal sheet in said plane is defined by a perpendicular projection of the further embossed structure of the first metal sheet onto said plane, and wherein a centroid of the further embossed structure of the second metal sheet in said plane is defined by a perpendicular projection of the further embossed structure of the second metal sheet onto said plane;

wherein a distance and a maximum tolerance value are specified; and wherein an actual distance of the centroid of the first embossed structure from the centroid of the second embossed structure deviates from the specified distance by less than the specified maximum tolerance value, and wherein an actual distance of the centroid of the further embossed structure of the first metal sheet from the centroid of the further embossed structure of the second metal sheet deviates from the specified distance by less than the specified maximum tolerance value.

17. The separator plate arrangement according to claim 1, wherein the first metal sheet has at least three spaced-apart cutouts arranged outside of the first circumferential sealing structure and at least three spaced-apart embossed structures arranged outside of the first circumferential sealing structure, wherein the second metal sheet has at least three spaced-apart cutouts arranged outside of the second circumferential sealing structure and at least three spaced-apart embossed structures arranged outside of the second circumferential sealing structure, wherein each of the at least three embossed structures of the second metal sheet is arranged at least in part in a region of the second metal sheet that is defined by a perpendicular projection of one of the at least three cutouts of the first metal sheet onto the second metal sheet, so that in each case at least one of the at least three embossed structures of the second metal sheet is visible through each of the at least three cutouts of the first metal sheet, and wherein each of the at least three embossed structures of the first metal sheet is arranged at least in part in a region of the first metal sheet that is defined by a perpendicular projection of one of the at least three cutouts of the second metal sheet onto the first metal sheet, so that in each case at least one of the at least three embossed structures of the first metal sheet is visible through each of the at least three cutouts of the second metal sheet.

18. A method for producing a separator plate arrangement, comprising the steps:

punching a first cutout out of a first metal sheet in a first tool;

embossing a first embossed structure, adjacent to the first cutout, into the first metal sheet in a second tool;

punching a second cutout out of a second metal sheet in a third tool;

embossing a second embossed structure, adjacent to the second cutout, into the second metal sheet in a fourth tool; and positioning the first metal sheet and the second metal sheet one on top of the other so that the first metal sheet and the second metal sheet touch one another at least in part along the mutually facing flat sides thereof and the first embossed structure of the first metal sheet is arranged at least in part in a region that is defined by a perpendicular projection of the second cutout of the second metal sheet onto the first metal sheet and the second embossed structure of the second metal sheet is arranged at least in part in a region that is defined by a perpendicular projection of the first cutout of the first metal sheet onto the second metal sheet, wherein the first metal sheet has a first circumferential sealing structure, the first cutout is arranged outside of the first circumferential sealing structure, and the first embossed structure arranged outside of the first circumferential sealing structure, wherein the second metal sheet has a second circumferential sealing structure, the second cutout arranged outside of the second circumferential sealing structure, and the second embossed structure arranged outside of the second circumferential sealing structure.

19. A method for producing a separator plate arrangement comprising:

punching a first cutout out of a first metal sheet in a first tool;

embossing a first embossed structure, adjacent to the first cutout, into the first metal sheet in a second tool;

punching a second cutout out of a second metal sheet in a third tool;

embossing a second embossed structure, adjacent to the second cutout, into the second metal sheet in a fourth tool;

positioning the first metal sheet and the second metal sheet one on top of the other such that:
the first metal sheet and the second metal sheet touch one another at least in part along the mutually facing flat sides thereof,
the first embossed structure of the first metal sheet is arranged at least in part in a region that is defined by a perpendicular projection of the second cutout of the second metal sheet onto the first metal sheet, and
the second embossed structure of the second metal sheet is arranged at least in part in a region that is defined by a perpendicular projection of the first cutout of the first metal sheet onto the second metal sheet;

punching a further cutout out of the first metal sheet in the first tool;

embossing a further embossed structure, adjacent to the further cutout, into the first metal sheet in the second tool;

punching a further cutout out of the second metal sheet in the third tool;

embossing a further embossed structure, adjacent to the further cutout, into a second metal sheet in the fourth tool; and positioning the first metal sheet and the second metal sheet one on top of the other such that:
the first metal sheet and the second metal sheet touch one another at least in part along the mutually facing flat sides thereof, and
the further embossed structure of the first metal sheet is arranged at least in part in a region that is defined by a perpendicular projection of the further cutout of the second metal sheet onto the first metal sheet and the further embossed structure of the second metal sheet is arranged at least in part in a region that is defined by a perpendicular projection of the further cutout of the first metal sheet onto the second metal sheet.

20. The method of claim 19, further comprising:

contactlessly detecting a distance of a first reference point from a second reference point, wherein the first reference point is determined on the basis of the first embossed structure of the first metal sheet, and wherein the second reference point is determined on the basis of the second embossed structure of the second metal sheet, contactlessly detecting a distance of a third reference point from a fourth reference point, wherein the first reference point is determined on the basis of the further embossed structure of the first metal sheet, and wherein the fourth reference point is determined on the basis of the further embossed structure of the second metal sheet, and if a deviation of the distances detected above is not greater than a respectively defined maximum distance, connecting the first metal sheet to the second metal sheet.

\* \* \* \* \*